(12) United States Patent
Gardner et al.

(10) Patent No.: US 11,409,487 B2
(45) Date of Patent: Aug. 9, 2022

(54) POWER MANAGEMENT IN A LOGIC CIRCUITRY PACKAGE

(71) Applicant: HEWLETT-PACKARD DEVELOPMENT COMPANY, L.P., Spring, TX (US)

(72) Inventors: James Michael Gardner, Corvallis, OR (US); Stephen D. Panshin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 16/959,397

(22) PCT Filed: Oct. 25, 2019

(86) PCT No.: PCT/US2019/058189
§ 371 (c)(1),
(2) Date: Jun. 30, 2020

(87) PCT Pub. No.: WO2021/080620
PCT Pub. Date: Apr. 29, 2021

(65) Prior Publication Data
US 2021/0405946 A1     Dec. 30, 2021

(51) Int. Cl.
*G06F 3/12*      (2006.01)
*B41J 2/00*      (2006.01)
(Continued)

(52) U.S. Cl.
CPC ............. *G06F 3/1294* (2013.01); *B41J 2/00* (2013.01); *G06F 3/1221* (2013.01);
(Continued)

(58) Field of Classification Search
CPC ...... B41J 2/00; B41J 2/17546; B41J 2/17553; G06F 21/00; G06F 3/1221; G06F 3/1231;
(Continued)

(56) References Cited

U.S. PATENT DOCUMENTS

| 6,536,871 B1 * | 3/2003 | Haddick .............. B41J 2/17503 347/50 |
| 6,866,359 B2 | 3/2005 | Pan et al. |

(Continued)

FOREIGN PATENT DOCUMENTS

| DE | 102014004362 | 10/2015 |
| EP | 237163 A | 9/1987 |
| EP | 2237163 | 10/2010 |

*Primary Examiner* — Terrell S Johnson
(74) *Attorney, Agent, or Firm* — Dicke Billig & Czaja PLLC

(57) ABSTRACT

A logic circuitry package for a replaceable print apparatus component includes an interface including a power terminal and at least one logic circuit. The at least one logic circuit is configured to respond to communications sent to a first address via the interface and respond to communications sent to a second address via the interface. The at least one logic circuit is configured to in response to a first command sent to the first address, draw a first current on the power terminal; and in response to a hibernate command sent to the first address, respond to communications sent to the second address and draw a second current on the power terminal less than the first current.

20 Claims, 17 Drawing Sheets

400a
LOGIC CIRCUITRY PACKAGE

402a
FIRST LOGIC CIRCUIT

(51) Int. Cl.
  G06F 21/00 (2013.01)
  G06K 15/00 (2006.01)
  H03K 19/00 (2006.01)
  B41J 2/175 (2006.01)

(52) U.S. Cl.
  CPC ............ G06F 3/1231 (2013.01); G06F 21/00 (2013.01); G06K 15/4055 (2013.01); B41J 2/17546 (2013.01); B41J 2/17553 (2013.01); G06K 15/4075 (2013.01); H03K 19/0016 (2013.01)

(58) Field of Classification Search
  CPC .............. G06F 3/1294; G06K 15/4055; G06K 15/4075; H03K 19/0016
  See application file for complete search history.

(56) References Cited

U.S. PATENT DOCUMENTS

| | | |
|---|---|---|
| 9,213,396 B1 | 12/2015 | Booth |
| 9,329,824 B2 | 5/2016 | Gray et al. |
| 9,335,807 B2 | 5/2016 | Matsumoto et al. |
| 2004/0208660 A1 | 10/2004 | Ito et al. |
| 2010/0306431 A1 | 12/2010 | Adkins |
| 2011/0131441 A1 | 6/2011 | Asauchi |
| 2013/0054933 A1* | 2/2013 | Fister ................ G03G 15/0863 711/E12.061 |
| 2013/0067016 A1 | 3/2013 | Adkins |
| 2018/0143935 A1 | 5/2018 | Cox |
| 2021/0354450 A1* | 11/2021 | Gardner ............... B41J 2/17546 |
| 2021/0402785 A1* | 12/2021 | Panshin ............... B41J 2/17546 |

* cited by examiner

POWER MANAGEMENT IN A LOGIC CIRCUITRY PACKAGE

CROSS-REFERENCE TO RELATED APPLICATIONS

This application is a U.S. National Stage Application of PCT Application No. PCT/US2019/058189, filed Oct. 25, 2019, entitled "LOGIC CIRCUITRY PACKAGE".

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
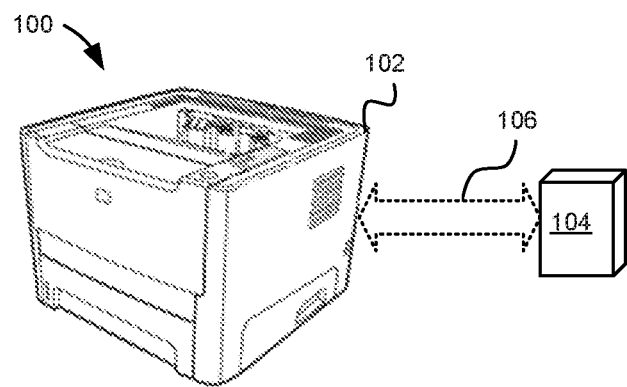
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
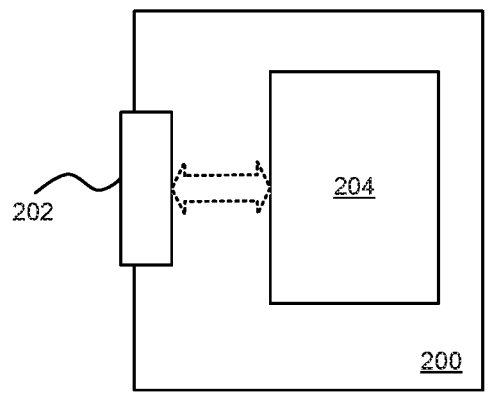
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
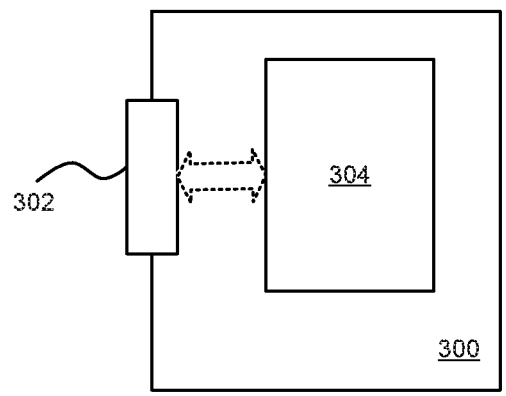
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
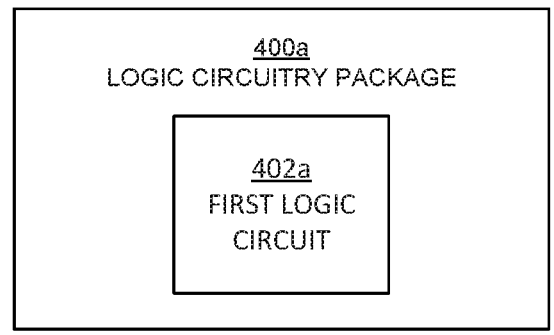
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. The hardware logic circuit can include analog sensor functions. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
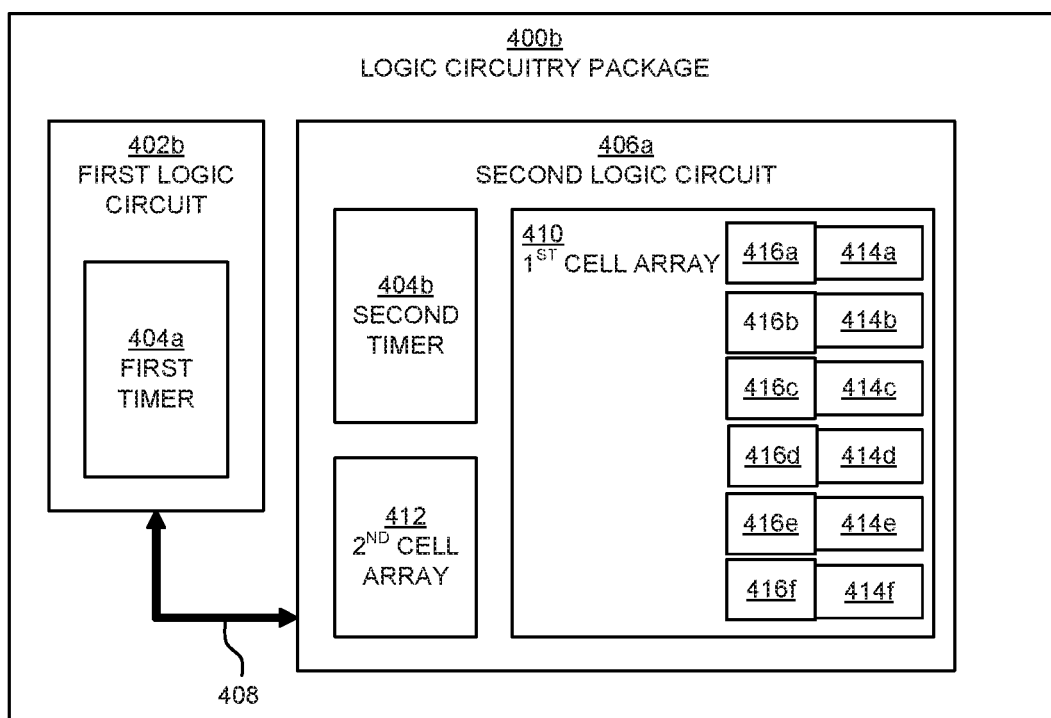

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408. In other examples, that are not the topic of FIG. 4B, a single integrated logic circuit may simulate the functions of the second logic circuit.

Back to FIG. 4B, in one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator, or some other form of oscillator or timer. In yet other examples, the timer may include a plurality of delay circuits each of which is set to expire after a certain time period, whereby depending on the timer period indicated in a first command, the delay circuit is chosen.

In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b. The first logic circuit 402b is configured to use the first timer 404a to determine the duration of the enablement, that is, to set the time period of the enablement.

In another example, the first logic circuit 402b enables the second logic circuit 406a in response to a hibernate command sent to the first address. The hibernate command instructs the first logic circuit 402b to enter a low power state. In the low power state, the first logic circuit 402b is not accessible via the first address and is effectively disabled. In one example, in the low power state, the first logic circuit 402b draws less than 170 µA. The first logic circuit 402b exits the low power state in response to power to the first logic circuit 402b being cycled.

In the above examples, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to reconfigure the initial second address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register. For example, while the first address of the first logic circuit is different for each different associated print material (e.g., different color inks have different first addresses), the second logic circuits can be the same for the different print materials and have the same initial second address.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may also be identifiable by sensor ID. The sensor ID may include both the sensor type ID to select the array or type and the sensor cell ID to select the cell in the selected type or array, whereby the latter may also be called "sub-"ID. The sensor IDs (including the sub-IDs) may include a combination of addresses and values, for example register addresses and values. The addresses of the sensor cell array ID and the sensor cell ID may be different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs. In examples where there is only one cell of a certain sensor type, one sensor ID may be sufficient to select that cell. At the same time, for that single sensor cell, different sensor "sub-"IDs will not affect the sensor cell selection because there is only one sensor cell. In this disclosure, sensor ID parameters are described. A sensor ID parameter may include a sensor ID. A sensor ID parameter may include a sensor type ID or a sensor cell ID. The same sensor ID (e.g., to select a sensor type) and different sensor sub-IDs (e.g., to select a sensor cell) may be used to select different sensor cells. The sensor ID parameters can include only the sensor sub-ID, for example where the sensor type has been previously set so that only the sensor cell needs to be selected.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors (e.g., crack sense resistors), etc. In this disclosure, different sensor types may also be referred to as different sensor classes. As mentioned, earlier, this disclosure encompasses alternative examples (e.g., mentioned with reference to FIGS. 6 and 13) of logic circuitry packages without the described analog sensor cell arrays, whereby responses may be generated based on class parameters (i.e., sensor ID parameters) without using a physical sensor cell for generating the output.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a. More than two different sensor types may be provided, for example three, four, five or more sensor types, may be provided, wherein each sensor type may be represented by one or more sensor cells. Certain cells or cell arrays may function as stimulators (e.g., heaters) or reference cells, rather than as sensors.

Figure 4C:
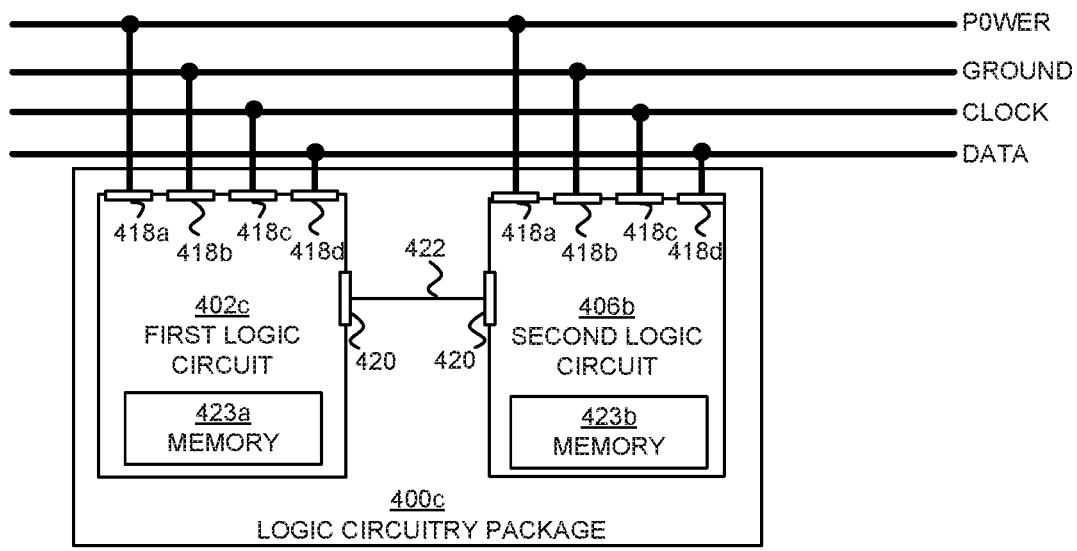

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In one example, the first logic circuit 402c enables the second logic circuit 406b in response to a command sent to the first address including a time period. In another example, the first logic circuit 402c enables the second logic circuit 406b in response to a hibernate command sent to the first address. The hibernate command instructs the first logic circuit 402c to enter a low power state. In the low power state, the first logic circuit 402c is not accessible via the first address and is effectively disabled. In one example, in the low power state, the first logic circuit 402c draws less than 170 µA. The first logic circuit 402c exits the low power state in response to power to the first logic circuit 402c being cycled.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc. The first logic circuit 402c may be, or function as, a microcontroller or secure microcontroller.

In this example, memory 423b of the second logic circuit 406b includes a programmable address register to contain an initial address of the second logic circuit 406b when the second logic circuit 406b is first enabled and to subsequently contain a new (temporary) second address (in some examples in a volatile manner) after that new second address has been communicated by the print apparatus. The new, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400c is shown in FIG. 4C, there may be a plurality of packages with a similar or a different configuration attached to the bus.

Figure 4D:
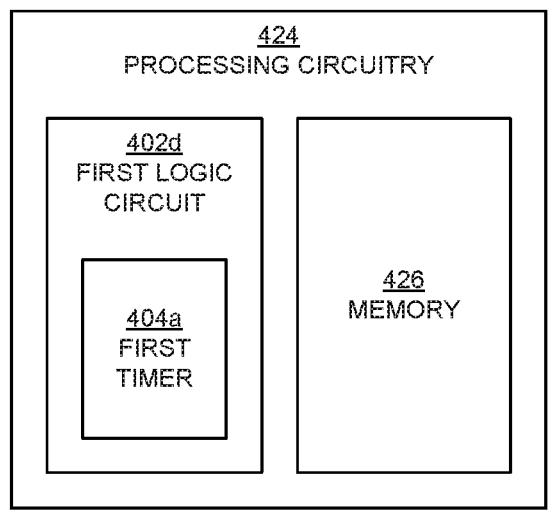

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may include a cryptographic process such as any kind of cryptographically authenticated communication or message exchange, for example based on a key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in US patent publication No. 9619663.

In some examples, the memory 426 may store data including: identification data and read/write history data. In some examples, the memory 426 further includes cell count data (e.g., sensor count data) and clock count data. Clock count data may indicate a clock speed of a first and/or second timer 404a, 404b (i.e., a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored in the memory 426 is to be communicated in response to commands received via the second address, for example the earlier mentioned initial or reconfigured/temporary second address. In some examples, the memory 426 includes a programmable address register or memory field to store a second address of the processing circuitry (in some examples in a volatile manner). The first logic circuit 402d may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404a, 404b as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

In another example, the processing circuitry 424 may be configured such that in response to a hibernate command sent to the first logic circuit 402d addressed using the first address, the processing circuitry 424 is to enter a low power state and disregard (e.g., 'ignore' or 'not respond to') I2C traffic sent to the first address until the processing circuitry exits the low power state. The processing circuitry 424 may exit the low power state by cycling power to the processing circuitry 424. While in the low power state, the processing circuitry 424 is accessible by at least one second address.

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor. In an alternative example, the processing circuitry 424 may include a single, integral logic circuit, and one or more sensors of one or more types.

Figure 4E:
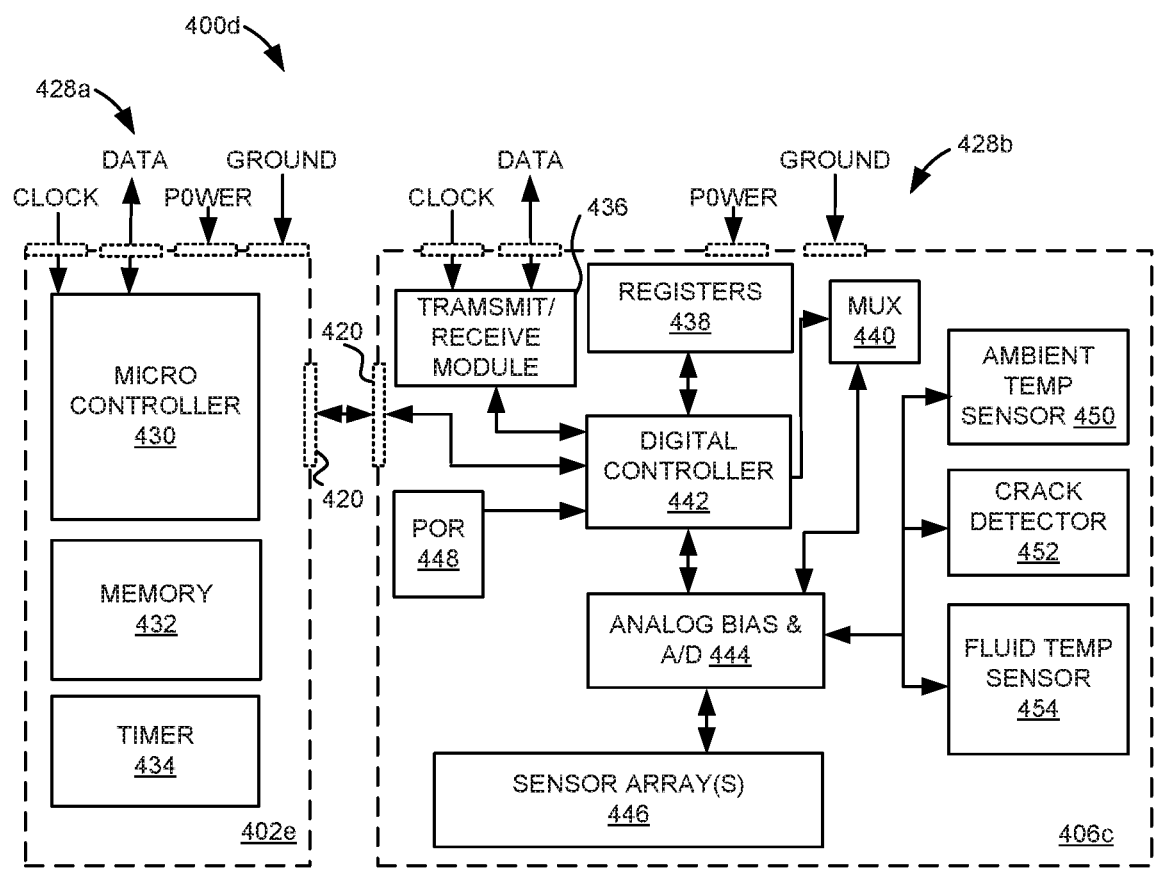

FIG. 4E illustrates another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors 450, 452, 454. For example, a current may be provided to a sensing resistor and the resultant voltage may be converted to a digital value. That digital value may be stored in a register and read out (i.e., transmitted as serial data bits, or as a bitstream) over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
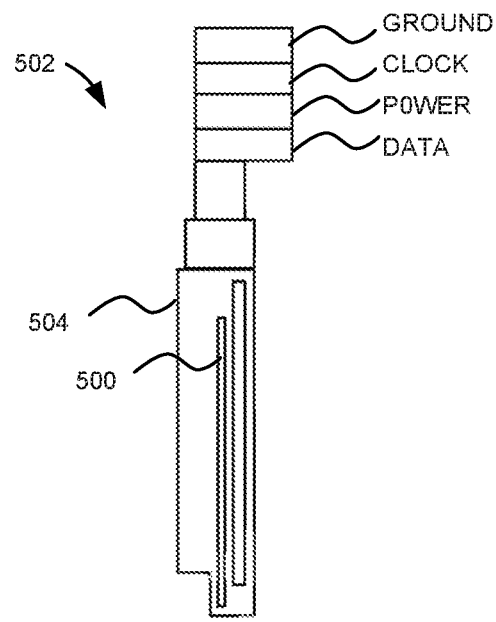
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
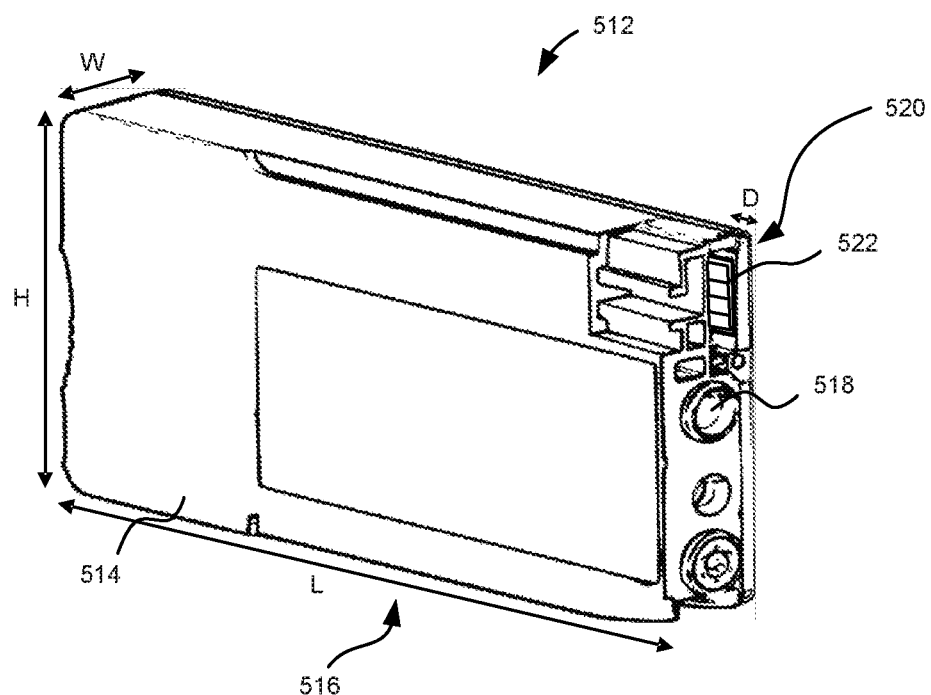
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

Figure 6:
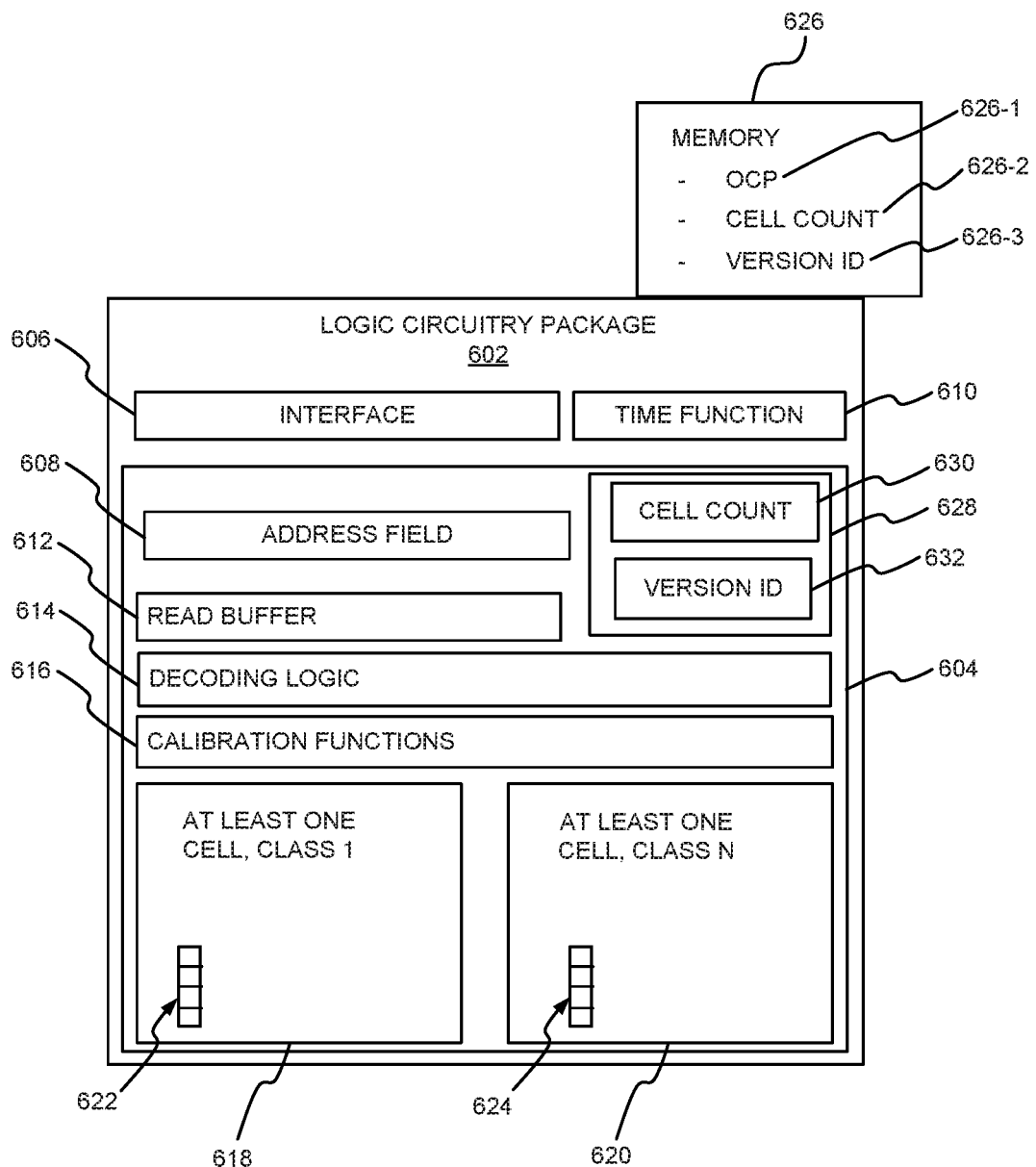
FIG. 6 illustrates another example of a logic circuitry package.

FIG. 6 illustrates another example of a logic circuitry package 602 for a replaceable print component in accordance with this different examples of disclosure. The logic circuitry package 602 may be an intermediate product, configured to be part of a replaceable print component such as a 2D or 3D print cartridge including a reservoir for print material. The print material may be a print liquid (e.g., ink) or print powder (e.g., toner, 3D build powder) or any other agent to print in two-dimensional or three-dimensional print processes.

The logic circuitry package 602 includes at least one logic circuit 604, for example a plurality of interconnected logic circuits, physically integrated in a single support structure or physically separated using different support structures. The package may include a molded compound and/or the print material container as a support structure, whereby sub-circuits or (sensor) cells of the package may be physically electrically connected or wirelessly connected. Where there are different logic circuits, these may be interconnected, at least through the interface 606 and/or through other wiring or wireless interfaces. In one example, the logic circuitry package 602 includes a first logic circuit that is a microcontroller or has the properties of a microcontroller. In a further example, the package 602 includes a logic circuit 604 that responds to commands directed to a different address than a default I2C communication address of the first logic circuit. The logic circuit 604 can be the second logic circuit described above and/or a sensor circuit. The first and second logic circuit addressed previously may be connected to the same interface 606, and may be, but need not be, packaged together in this package 602. In another example, the logic circuitry package 602 has only a single integrated logic circuit with integrated functions, for example in a single compact package.

The logic circuitry package 602 may include a communication interface 606 to communicate with a print apparatus logic circuit through an interface bus, such as an I2C serial communication bus, for example connecting power, data, clock and/or ground, as explained earlier (certain examples may use fewer contacts and harvest power from the clock or data signal). In other examples, the interface 606 may facilitate digital communications that are not in accordance with an I2C communication protocol. In yet other examples, the interface 606 may facilitate analog communications.

In accordance with earlier mentioned principles in this disclosure, the logic circuit 604 may include an address field 608. The address field 608 facilitates that the logic circuit 604 transmits command portions received from the print apparatus logic circuit and directed to the address of the address field 608 to the different functions of the logic circuit 604. The address field 608 may have a default second address (e.g., after reset) and may be adapted to facilitate reconfiguration of its set address to any (e.g., random) new second address. The logic circuit 604 may further include a time function 610 such as a timer or delay circuit that may be monitored or may be set to expire at the end of a specified time period, so that after the time period the logic circuitry package 602 again processes communications over the first address different than the address of the address field 608. The time function 610 is referred to as timer in previous examples of this disclosure.

The timer may include an integral timer, internal to the logic circuitry, for example including a Resistance-Capacitor (RC) circuit configured to act as a timer, logic gates configured with a counter, a crystal or a ring oscillator, a phase lock loop (also known as a phase-locked loop) or the like, or any timer which may logically form part of a logic circuitry package 602. The timer may provide an internal clock signal which is provided even in the absence of a clock signal on the serial data bus. The timer may count and thus allow for determination of the duration of the timer period specified in the first command. In one example, a delay circuit may be provided for the time function which may be at least partly the same as the timer, only that it can be set to expire in accordance with the specified time period, and hence, it does not require monitoring by a controller function of the logic circuitry package 602. The delay circuit may include a plurality of selectable delay circuits, each expiring after a different duration. The delay circuit may include a plurality of delay line switches, each set to expire after a characteristic duration. An example of a delay line switch includes a transistor with a leaking floating gate, or an R-C circuit and a comparator, for example similar to aspects of the timer. In one example, the delay function is configured to, upon receipt of the first command, select the delay line switch that corresponds with the specified time period and enable it.

The package 602 includes a read buffer 612 to be read by the print apparatus logic circuit, for example, through the serial bus interface 606. In one example, the logic circuit 604 is to load a value to the buffer 612 in response to a read request, which value has been generated based on certain previously set or communicated parameters. In other examples, the logic circuit 604 may be configured to output analog signals.

The package 602 further includes decoding logic 614 to identify calibration, class and/or sub-class parameters in an input command stream, which parameters condition the output of the logic circuit 604. The class and sub-class parameters are referred to as sensor ID parameters in other portions of this disclosure. For example the class and sub-class parameters correspond to the sensor ID and the sub-ID, whereby the sensor ID parameters may encompass both the class and sub-class parameters.

The package 602 includes calibration logic including one or more calibration functions 616 to calibrate the output based on the calibration parameters received from the print apparatus logic circuit. The calibration logic may be common calibration logic to calibrate inputs and/or outputs (calibrating an input may affect the output and may in this disclosure be included in calibrating the output) for a plurality of classes.

As will be explained below, each parameter may specify a function (e.g., to indicate which function to address like a certain calibration function, class selection function, or sub-class selection function) and a value (e.g., to set the ID or magnitude of the selected function, for example, to identify which sensor or cell to select). The decoding logic 614 may be configured to identify these parameters and select or set a corresponding logic function (e.g., set a calibration function based on the calibration value; select a sensor based on the class ID; select a sensor cell based on the sub-class ID). The logic circuit 604 may be configured to respond to each read request with an output (e.g., count value) based on the parameters that were last communicated by the print apparatus logic circuit, or, where for certain logic functions no parameters were communicated, based on certain default-parameters-after-reset. In this disclosure logic functions may include a variety of different calibration functions, class selection functions (e.g., sensor select functions) and sub-class select functions (e.g., sensor cell select functions), whereby respective logic functions may be set or selected in accordance with the received parameters. For example, a plurality of logic functions may be selected/set based on a single command stream such as selecting a sensor based on a class parameter, selecting a cell of that sensor based on a sub-class parameter, and, applying certain calibration settings based on certain calibration parameters.

The logic circuit 604 may include at least two cell classes, for example a first and second cell class, each associated with a cell array of nominally the same cells in the same array, yet nominally different between the arrays/classes. The logic circuit 604 may include further cell classes, for example a third and fourth class, each of which is defined by not more than one cell that provides a respective single cell output. In different examples, at least two, three, four, five, six or more different cell classes may be provided, wherein each cell of each class is nominally different than each cell of other classes. For the purpose of illustration, FIG. 6 shows only a limited amount of cell classes 618, 620 and cells 622, 624. In other examples, there could be greater numbers of cell arrays and cells. Cell arrays 618, 620 including sensor cells 622, 624 may also be referred to as sensors, wherein cells of different classes have different sense functions.

In this example, different sensor types may be denominated by class, and cells of the same type may be denominated by sub-class. The example logic circuitry package 602 includes different cell arrays 618, 620 of different classes. Each cell class may be associated with a particular type of cell 622, 624. For example, each cell may be an electrical component and each cell class may refer to an array of electrical components having the same electrical properties. The same properties may refer to the same nominal electrical properties, for example defined by material, physical design, etc. There may be marginal differences between cells of the same array having the same nominal properties due to tolerances or imperfections in fabrication and materials. The cells may have at least approximately the same electrical properties within certain manufacturing tolerances, for example including sensitivity, resistance, impedance, capacitance, conductivity, etc.

Each cell may provide a respective output value or signal in response to being selected and when under charge, whereby the output or signal may be representative of a state of the cell, for example an electrical property state. Print apparatus commands may be received by a logic circuit 604, and class and sub-class parameters may be identified, to facilitate selecting a respective sensor type and sensor cell, respectively, of the logic circuit 604.

The logic circuitry packages 602 may be provided with at least three or four different cell classes. One or two of those classes may include at least 10, 20, 40, 60, 80, 100, or 126 sub-classes, for example, cells of the same nominal characteristics yet associated with different IDs such as different cell numbers. Cells of sensor cell arrays may be selected by associated class and sub-class parameters using the decoding logic 614, to facilitate reading each selected sensor cell by the print apparatus logic circuit. Furthermore, the logic circuitry package 602 may include at least one individual single-cell sensor in which case class parameters may be sufficient to select the cell and sub-class parameters are redundant.

The logic circuit 604 may be configured so that cells 622, 624 of different cell arrays 618, 620 are selected by the same parameter values, for example, after being selected by different class parameters. For example, cells of different classes use the same series of IDs, wherein the IDs can be embodied by binary numbers. This may facilitate sharing of circuitry such as certain decoding logic functions. For example, all or some of the cells of different arrays 618, 620 may be associated with the same cell numbers. For example, the first and further cells of the first cell array are denominated 1, 2, 3 . . . n and the first and further cells of the second cell array are also denominated 1, 2, 3 . . . n. These numbers may be encoded in binary fashion. In other words, a cell of a first class and a cell of a second class, which are nominally different, may be selected using the same sub-class parameters, but preceded by different cell class selections parameters in the command stream.

In other, alternative, virtual embodiments, classes and other parameters are associated with respective portions of a look-up table (LUT), in addition to, or instead of, the physical cells. In, again, other alternative examples algorithms may be used to output certain values based on identified class and other parameters, whereby the classes and/or sub-classes may be difficult to detect. The example of FIG. 6 illustrates different physical cell classes 618, 620 and different physical cell sub-classes 622, 624 whereas alternative, virtual logic functions are discussed elsewhere in this disclosure, such as with reference to FIG. 13.

The physical cells may include electrical components including resistors, strain gauges, diodes, different types of sensors, but also "dummy" cells, test cells or reference cells, for a variety of purposes. In one example, the cells are sensor cells.

Calibration functions 616 may include calibration logic such as one or a combination of offset circuits, gain amplifiers, different AD and DA converter circuits, heater arrays, or virtual (programmed) calibration functions. A virtual calibration function may use offset or amplifier functions similar to hardwired calibration logic circuits. Different calibration functions may be combined in a single calibration logic circuit.

The logic circuitry package 602 may include a memory 626 to store certain characteristics of the logic circuit 604. The memory 626 may be part of the logic circuit 604 or may be separate from the logic circuit 604.

In one example, a second memory 628 is part of the logic circuit and stores a cell count 630 indicative of a number of cells associated with at least one class or with a plurality of classes with the same number of cells. In one example, the cell count 630 is a last cell number (which may be the total number of cells minus one as the first cell may be represented by a 0). For example, the cell count corresponds to a maximum number of cells of one, two, three or more predetermined classes. For example, a logic circuit may have a certain number of temperature sensor cells 624 and the same number of strain sensing cells 622. In another example, a first memory 626, associated with a first address, and the second memory 628, associated with a second address, each store the cell counts 626-2, 630, respectively in a differently encoded fashion. In another example, a value associated with a version/revision ID 632 of the logic circuit 604 is stored in the second memory 628. In one example, the second memory 628 is embodied by a series of memory fields such as registers, addressable by memory addresses.

The cell count and/or version/revision ID can be stored as part of digitally signed data. The count and ID associated with the first (626-2, 626-3) versus second address (630, 632) may match, that is, contain the same yet differently encoded value, in a way that is to be validated by the print apparatus. The data associated with the first versus the second (default or new) communications address, for example stored in the first versus second memory, may be encoded differently, for example, signed and/or encrypted where it is associated with the first address versus not signed and/or not encrypted, respectively, where it is associated with the second address. While the example of FIG. 6 illustrates two separate memories 626, 628, in an alternative example, the logic circuit 604 includes a single memory with the same data, and wherein the logic circuit 604 may be configured to encode the data depending on whether the print apparatus command is directed to the first versus the second address.

The decoding logic 614 is configured to identify, from a command stream received from the print apparatus, class parameters to select respective cell classes 618, 620 based on the parameters. The logic circuit 604 is configured to respond with output values or signals representing the selected cell class. As explained, the cell class may be associated with a cell array 618, 620 or a single cell (e.g., see the example of FIG. 4E). Similarly, the decoding logic 614 is further configured to identify, from the command stream, cell sub-class parameters, to select a cell 622, 624 of a previously selected cell array 618, 620.

The decoding logic 614 may be configured to load the parameters specified in commands and select the corresponding sensors and cells, or set the corresponding calibration functions. For example, the decoding logic 614 includes a memory field arrangement to store parameters for respective logic functions, the logic functions including the calibration function 616 as well as the sensor classes 618, 620, and sensor cells 622, 624. Each memory field may be adapted to store a parameter for a connected logic function, for example to store a cell class number, a cell number, a calibration parameter, etc. The memory field arrangement may include shift registers as explained in earlier examples.

The decoding logic 614 may further include multiplex logic to set the logic functions in accordance with the parameters stored in the memory fields, for example connecting these memory fields with the logic functions. The multiplex logic may include a series of flip-flops, latches, and/or switches. In one example, upon receiving commands specifying the second (default or new) communication address, the decoding logic 614 loads the respective parameters and shifts the bit values to set or select the respective logic function.

In one example, communicated parameters identify each function by a register address. The decoding logic 614 may include 8-bit input registers whereby each register is associated with a particular function, such as the sensor selection, cell selection and (a particular type of) calibration, for example through the multiplex logic. Alternative examples that are discussed elsewhere in this disclosure may use virtual decoding logic functions, embodied by instructions to be executed by a processor, to identify the parameters in the command stream and set or select respective (virtual) logic functions to provide outputs that the print apparatus logic circuit may validate.

The logic circuit 604 is configured to, when the sensor cells are charged, and a respective cell is selected, output a value representing a reading of the selected cell, whereby the output is calibrated in accordance with the (received or default) calibration parameters. A cell reading inside the logic circuit 604 may include a voltage or other analog reading, while an output after conversion may be a digital value such as an output count value. The logic circuit 604 is configured to, in response to a read request, output a respective value or signal associated with the (last) selected cell, applying the last received calibration parameters. The output, be it digital or analog, may represent a state of a selected cell, such as temperature, stress, resistance, voltage state, etc.

The "parameters" in the commands condition the output by the logic circuit 604. The parameters may select a particular cell of a particular sensor in an array, or a particular calibration setting. Another parameter that conditions the output is the time period during which the package 602 responds to commands directed to a second and/or new address different from the first address, although it may condition the output duration and input address rather than individual output count values.

"Identifying" a parameter in a command stream, such as a class, sub-class or calibration parameter, includes distinguishing the respective parameters from other bits in a bitstream (like other not-related commands, start bits, end bits, acknowledge bits, communication address bits, etc.), to be able to process and/or act upon these parameters to appropriately condition responses. This decoding ability (i.e., decoding function) may be hardwired or programmed or both. For example, by identifying a class or sub-class parameter, the decoding logic 614 may use the associated class or sub-class for generating the output, either through physical electrical measurements and/or through a LUT or calculation, or in a hybrid fashion that combines physical cell readings with virtual data to generate a digital output. Various hardwired examples with analog sensor arrays have been described in this disclosure as well as alternative "virtual" examples that are designed to emulate the output in accordance with their hardwired/analog counterparts.

In one example, at least one calibration function 616 of the logic circuit 604 is to condition the output based on the input calibration parameters. In this disclosure, it may be understood that conditioning an input (e.g., DA conversion, offsetting and/or amplifying an input to cells before conversion by the cells) also conditions the output. Hence any signal calibration between command and response may be considered as conditioning the output. Calibration parameters may be adjusted by the print apparatus logic circuit based on returned output values. After reading an output of the logic circuit 604, based on certain previous calibration parameters, the print apparatus logic circuit may send new calibration parameters in response to which the logic circuit 604 may output new outputs.

Certain operational calibration parameters may be used to set a cell output to a suitable value within an operational or readable output range to facilitate determining a suitable range of different states of a respective cell. Furthermore, certain operational calibration parameters may be determined for returning states of multiple cells within the suitable range. Operational calibration parameters for one class may be different than operational calibration parameters for another class. Different nominal electrical properties between different classes may result in different outputs between these classes, even where the applied charge and calibration parameters are the same. That said, it may be that specific operational calibration parameters can be made to work for one and the other class. Such specific calibration parameters could include a relatively low amplifier parameter. For low amplifier parameters, however, a variation between outputs of different cells may be relatively small, for example too small to be able to correctly determine different cell states. In examples of this disclosure, certain more optimal operational calibration parameters tend to be different for different classes, and there may be different sets or ranges of operational calibration parameters between classes. Also, calibration parameters related to a heater function may be used to influence output of a temperature sensor cell array while such heater function may not suitably influence output of a strain sensing cell array.

The calibration functions 616 may be integral to the logic circuit 604. Calibration functions 616 may include offset functions, amplifier functions, and conversion functions. These functions could be hardwired and defined by offset circuits, gain amplifiers and AD (Analog to Digital) or DA (Digital to Analog) conversion circuits, respectively, separately or in combination. For example, an offset and DA conversion may be combined in a single logic (e.g., VDAC) function, for example, where the offset function is provided by the DA converter, that, besides converting, is also configured to offset (i.e., set) an input power or voltage or a reference voltage, with respect to a power and ground of the I2C interface 606.

Further calibration functions 616 may include heat cell (i.e., heater) selections, heat power settings, heat timing, for example, for association with a temperature sensor array 620 to sense print material level. Alternative example calibration functions are embodied by programmed instructions, for example configured to offset or amplify certain input values on the basis of received calibration parameter values for example using a LUT or calculation.

In one example, each memory field of the decoding logic 614 is associated with a predetermined calibration function 616. The decoding logic 614 identifies received calibration parameters to store parameter values in associated memory fields, for usage as input parameter for the selected calibration function 616. In a non-operational, e.g., on-the-shelf and/or after-reset state, the calibration function 616 may be pre-set to default values. The calibration function 616 may be configured to switch to default values at or after each second/new address-enablement between time periods. Default or previously written calibration values apply to each of the calibration functions until a command is provided with new calibration values which replace (e.g., overwrite) the previous calibration values.

In one example, the same calibration functions 616 may commonly apply to a plurality of classes 618, 620. For example, the amplifier and/or offset functions are configured to calibrate outputs of cells of both first and second cell arrays, or of all cell classes. Hence, where certain calibration parameters are applied to cells of a first array, they can be repeated for a second array if no new calibration parameters have been set, at least during the same time period where the second/new address is enabled. In certain instances, however, a print apparatus logic circuit may choose to apply different calibration parameter values to different classes, for example to use more optimal operational calibration parameters for a respective class. Therefore, when the logic circuit 604 receives a new class parameter to select a new class, previously used operational calibration parameters with which in-range output values were generated for a previous class, may now generate outputs outside of the range or at the ends of the range, i.e., not-operational calibration parameters, so that new (operational) calibration parameters are applied for the new class.

In a further example, a heating element array or heater cell array may be provided, which in one example is considered one of the calibration functions 616, for example part of the calibration logic. Such heater cell array may extend along a corresponding temperature sensor cell array (for example, see also FIG. 4B and international patent application publication WO2017/074342). Correspondingly, certain input heat parameters such as heater cell selection, heat time and heat power may be considered calibration parameters. Changing the heat parameters may in fact influence the state of the temperature sensor cells, different than certain other calibration parameters (offset, amplify) that only calibrate the output value without directly influencing a cell state.

In one example, certain operational calibration parameters can be determined at manufacture and stored in the memory 626 while other operational calibration parameters are to be determined at customer usage, for example a first off-the-shelf customer usage. The calibration parameters that are used in a first calibration cycle, for example for further optimization, can be retrieved either from the logic circuitry package's memory 626 of from a memory of the print apparatus. In one example, the memory 626 of the logic circuitry package 602 is read by the print apparatus by sending a request to the first address, and then the same calibration parameters are sent as part of a command to the logic circuit via the second or new communication address, for conditioning the output count values.

For example, at least one of a heat, offset, gain/amplifier, AD and DA parameter may be stored in the memory 626 for a certain class. For example, a plurality of operational calibration parameters ("OCP") 626-1 or a plurality of sets of operational calibration parameters may be stored in the memory 626 of the package 602, wherein each operational calibration parameter or set thereof is to be associated with a respective cell class. For example, the logic circuitry package 602 is configured to, using the stored at least one operational calibration parameter 626-1, output count values between the lowest and highest output count value of the output count value range. Note that the print apparatus logic circuit may use the stored operational calibration parameters 626-1 to start a further calibration cycle to determine better calibration parameters for usage during reading, for example calibration parameters that generate count values within a smaller sub-range at a certain distance from the highest or lowest output count values of the output range. In a further example, the memory 626 may store calibration parameters just to decrease a number of calibration cycles.

Figure 7:
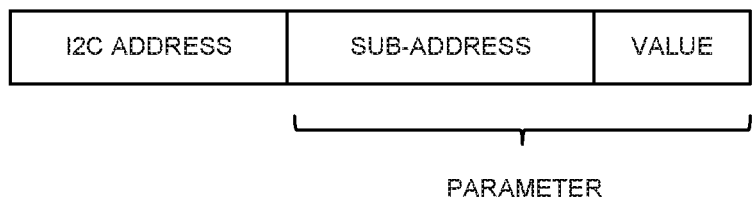
FIG. 7 illustrates an example of a command including a parameter.

As illustrated in FIG. 7, each command may be defined by a series of data frames including a parameter, wherein the command is configured for processing by the logic circuit 604 of various examples of this disclosure. The command of FIG. 7 illustrates three data frames. One data frame has encoded therein the I2C communication address, another data frame has encoded therein parameter function (here embodied by a sub-address such as a memory or register address) and another data frame has encoded therein the parameter value, whereby the function and value define the parameter. Acknowledge bits may be provided between data frames, for example for the logic circuit to identify the different data frames.

Each parameter may specify one or more functions and one or more corresponding values. In this example, the parameter function is defined by a sub-address (called "sub-address" to distinguish from the second and/or reconfigurable address of the logic circuit) such as a memory field address, for example a register address, for example to select an 8-bit memory field or register for writing the parameter value. The parameter function determines which logic function (class, sub-class, calibration) to address. The data frame of the function may consist of 8 bits. The data frame of the parameter value may consist of 8 bits, to write to the memory field. The sub-address of the parameter is called function in this disclosure because the sub-address determines the memory field and, in turn, the memory field selects a respective logic function (e.g., calibration function, sensor class selection function, sensor cell sub-class selection function) to be set to its stored parameter value. To illustrate this, a class parameter can include a class selection register address and a value to select the class that is identified by that value. Similarly, a sub-class selection parameter can include a sub-class selection register address and a sub-class number, for example to select the cell associated with the number. Aspects of registers and register addresses are also described with reference to FIG. 4A.

For example, a first command to the logic circuit specifies a new (e.g., reconfigured/temporary second) I2C communications address, a first calibration parameter function, and a calibration parameter value; a second command specifies a new I2C communications address, a second calibration parameter function, and a calibration parameter value; a third command specifies the new I2C communications address, a class parameter function, and a class parameter value; and a fourth command specifies the new I2C communications address, a sub-class parameter function, and a sub-class parameter value. This facilitates the logic circuit to select the appropriate class and sub-class and appropriately set the selected calibration functions. Note that the sequence of these commands may vary. In one example, any sequence may be applied because the corresponding logic functions will only be activated in response to a certain calibration parameter (e.g., offset and/or DA conversion) and/or a read request.

In one example, the parameter value data frame may include a set of used (or: to-be-used) bits and a set of not-used (or: not-to-be-used) bits, whereby the set of used bits define the parameter value. The set of used bits may include the least significant bit. The not-used bits in the same data frame are not used by the respective logic function and may include the most significant bit. For example, a class can be selected based on bit-combinations of only three first bits including the least significant bit, ignoring five remainder bits in the data frame including the most significant bit. A sub-class can be selected based on bit-combinations of only seven bits including the least significant bit, ignoring the most significant bit in the data frame.

A memory field of a single address may drive several logic functions. Correspondingly, different bits of the parameter value data frame may drive different logic functions. In such example, the parameter function and parameter value of a single command transaction may actually encompass several parameter functions and several parameter values, respectively.

Certain bits typically included in the command, such as start bits, stop bits, acknowledge bits and/or other bits, are omitted from FIG. 7. The command structure may follow an I2C communication protocol. A single complete transaction or command may include an I2C address (e.g., the second default or new address) and the parameter.

The logic circuit 604 may be adapted to identify each of these fields (I2C address, register address, value) and respond (or not) accordingly. For example, a stream of different commands, wherein each command includes a separate parameter, may be illustrated by a repetitive sequence of the command illustrated in FIG. 7. Each command, also called transaction, may include a start bit, an I2C address, a register address, a value, and a stop bit. Also, other (not named) bits may be included such as acknowledge bits and certain not-used bits.

It is again noted that in one example the logic circuit is configured to select sensors using the class, and where necessary, sub-class, parameters. In such example, the class and sub-class parameters are the sensor ID parameters. In an alternative example that uses fewer or no sensor cells, the sensor ID (class/sub-class) parameters are used to select or at least drive the responses, to satisfy the print apparatus logic circuit.

Figure 8:
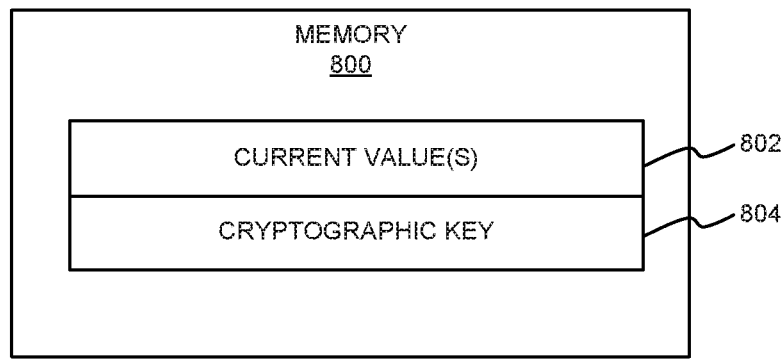
FIG. 8 illustrates one example of a memory of a logic circuitry package.

FIG. 8 illustrates one example of a memory 800 of a logic circuitry package, which may provide a part of memory 423a of logic circuitry package 400c (FIG. 4C), memory 426 of processing circuitry 424 (FIG. 4D), memory 432 of logic circuitry package 400d (FIG. 4E), or memory 626 of logic circuitry package 602 (FIG. 6). Memory 800 may store, in addition to other values previously described, current value(s) 802 and a cryptographic key 804 for operating a logic circuitry package. In some examples, the current value(s) 802 stored in memory 800 may be digitally signed.

As will be described in more detail below, the current value(s) 802 may correspond to at least one current expected to be drawn by the logic circuitry package during a specified operating state of the logic circuitry package. The current draw may be measured on a power terminal of the interface of the logic circuitry package (e.g., power/supply terminal 418a or ground terminal 418b of the I2C interface of logic circuitry package 400c). In one example, the current value(s) 802 include a plurality of digital values, where each digital value corresponds to one of an expected standby current, an expected first current, an expected second current, an expected third current, an expected fourth current, an expected fifth current, an expected sixth current, an expected seventh current, an expected eight current, and an expected ninth current corresponding to ten different operating states of the logic circuitry package. In other examples, the current value(s) 802 may include other digital values corresponding to other operating states of the logic circuitry package. A comparison of measured currents to expected currents for different operating states of the logic circuitry package may be used to ensure the print apparatus component is operating as expected (i.e., the component is not defective), to validate the component, or for other suitable purposes.

In one example, the standby current corresponds to an expected current draw of the logic circuitry package after power-up when the logic circuitry package is not processing any commands and not communicating over the interface (e.g., after power-up and prior to any commands being sent to the logic circuitry package and after processing of the first command is complete and prior to the second command being sent to the logic circuitry package, etc.). The standby current may be less than the first current and greater than the second current described below. In one example, the standby current is within a range between about 0.2 mA and about 0.5 mA.

In one example, the first current corresponds to an expected current draw of the logic circuitry package in response to a first command sent to the first address of the logic circuitry package. The first command may enable communications via the second address of the logic circuitry package (e.g., via a timer for a specified duration). The second current corresponds to an expected current draw of the logic circuitry package in response to a hibernate command sent to the first address of the logic circuitry package. The second current is less than the first current. In one example, the first current is greater than 3 mA and the second current is less than 2 mA. In another example, the first current is greater than 5 mA and the second current is less than 0.5 mA. In yet another example, the first current is greater than 8 mA (e.g., within a range between about 13 mA and about 16 mA) and the second current is less than 0.3 mA (e.g., within a range between about 3 µA and about 180 µA).

In one example, the third current corresponds to an expected current draw of the logic circuitry package when communications via the second address are enabled in response to the first command and in response to a second command sent to the second address of the logic circuitry package to enable an oscillator (e.g., first timer 404a of logic circuitry package 400b or processing circuitry 424, timer 434 of logic circuitry package 400d, or time function 610 of logic circuitry package 602) of the logic circuitry package. The third current is greater than the first current. In one example, the third current is greater than 3.1 mA, 5.1 mA, or 8.1 mA.

In one example, the fourth current corresponds to an expected current draw of the logic circuitry package when communications via the second address are enabled in response to the first command and in response to a third command sent to the second address of the logic circuitry package to enable an analog circuit (e.g., analog bias & A/D 444 of logic circuitry package 400d or decoding logic 614 and/or calibration functions 616 of logic circuitry package 602) of the logic circuitry package. The fourth current is greater than the third current. In one example, the fourth current is greater than 6 mA, 8 mA, or 11 mA.

In one example, the fifth current corresponds to an expected current draw of the logic circuitry package when communications via the second address are enabled in response to the hibernate command and in response to a second command sent to the second address of the logic circuitry package to enable an oscillator (e.g., first timer 404a of logic circuitry package 400b or processing circuitry 424, timer 434 of logic circuitry package 400d, or time function 610 of logic circuitry package 602) of the logic circuitry package. The fifth current is less than the first current and greater than the second current. In one example, the fifth current is less than 2 mA, 4 mA, or 7 mA and greater than 0.3 mA or 0.1 mA.

In one example, the sixth current corresponds to an expected current draw of the logic circuitry package when communications via the second address are enabled in response to the hibernate command and in response to a third command sent to the second address of the logic circuitry package to enable an analog circuit (e.g., analog bias & A/D 444 of logic circuitry package 400d or decoding logic 614 and/or calibration functions 616 of logic circuitry package 602) of the logic circuitry package. The sixth current is less than the first current and greater than the fifth current. In one example, the sixth current is less than 3 mA, 5 mA, or 8 mA and greater than 2.1 mA, 0.6 mA, or 0.4 mA.

In one example, the seventh current corresponds to an expected current draw of the logic circuitry package when communications via the second address are enabled (e.g., in response to a hibernate command or a command including a time period) and in response to a heater low command sent to the second address of the logic circuitry package to set a heater cell (e.g., a heater cell 416 of logic circuitry package 400b) to a low heat setting. The seventh current is greater than the second current. In one example, the seventh current is greater than 2 mA, 0.5 mA, or 0.3 mA.

The eighth current corresponds to an expected current draw of the logic circuitry package when communications via the second address are enabled and in response to a heater medium command sent to the second address of the logic circuitry package to set a heater cell (e.g., a heater cell 416 of logic circuitry package 400b) to a medium heat setting. The eighth current is greater than the seventh current. In one example, the eighth current is greater than 4 mA, 2.5 mA, or 2.3 mA.

The ninth current corresponds to an expected current draw of the logic circuitry package when communications via the second address are enabled and in response to a heater high command sent to the second address of the logic circuitry package to set a heater cell (e.g., a heater cell 416 of logic circuitry package 400b) to a high heat setting. The ninth current is greater than the eighth current. In one example, the ninth current is greater than 40 mA, 30 mA, or 20 mA.

Figure 9:
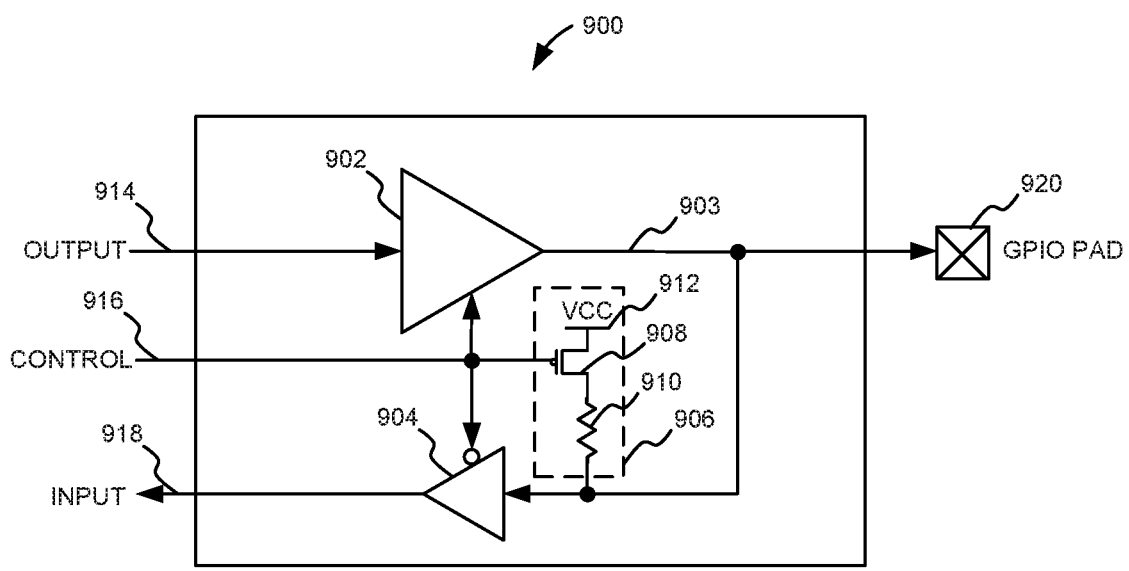
FIG. 9 illustrates one example of an input/output circuit of a logic circuitry package.

FIG. 9 illustrates one example of an input/output (I/O) circuit 900 of a logic circuitry package, such as logic circuitry package 400a-400d or 602, or of processing circuitry 424. I/O circuit 900 includes an output buffer 902, an input buffer 904, and a pull-up circuit 906. Pull-up circuit 906 includes a transistor (e.g., a PMOS transistor) 908 and a resistor 910. An output node 914 of the logic circuitry package is electrically coupled to the input of the output buffer 902. The output of the output buffer 902 is electrically coupled to a GPIO pad 920, the input of input buffer 904 and one side of resistor 910 through a signal path 903. A control node 916 of the logic circuitry package is electrically coupled to a non-inverting control input of output buffer 902, an inverting control input of input buffer 904, and the gate of transistor 908. The source-drain path of transistor 908 is electrically coupled between the other side of the resistor 910 and a supply voltage node (e.g., VCC) 912.

In response to a logic high or "1" signal on control node 916, the output buffer 902 is enabled, the input buffer 904 is disabled, and transistor 908 is turned off such that pull-up circuit 906 is disabled. Thus, with the control node 916 logic high, the GPIO pad 920 is configured as an output and signals on output node 914 may be passed to GPIO pad 920. In response to a logic low or "0" signal on control node 916, the output buffer 902 is disabled, the input buffer 904 is enabled, and transistor 908 is turned on such that pull-up circuit 906 is enabled. Thus, with the control node 916 logic low, the GPIO pad 920 is configured as an input and signals on the GPIO pad 920 may be passed to input node 918. In one example, with the pull-up circuit 906 enabled, the pull-up circuit 906 generates a logic high or "1" signal on GPIO pad 920.

In some examples, I/O circuit 900 may be part of first logic circuit 402b (FIG. 4B), first logic circuit 402c (FIG. 4C), or first logic circuit 402e (FIG. 4E). GPIO pad 920 may be electrically coupled to dedicated signal path 408 of logic circuitry package 400b (FIG. 4B) or provides a contact pin 420 of logic circuitry package 400c (FIG. 4C) or logic circuitry package 400d (FIG. 4E). In one example, in the low power state (e.g., in response to a hibernate command), the first logic circuit enables the second logic circuit by configuring GPIO pad 920 as in input and enabling the pull-up circuit 906. In one example, the first logic circuit exits the low power state in response to a reset signal (e.g., a logic low or "0" signal) being applied to GPIO pad 920 (e.g., by the second logic circuit) of the first logic circuit. In another example, the first logic circuit exits the low power state in response to a single power cycle of the logic circuitry package. With the first logic circuit not in the low power state, GPIO pad 920 may be configured as an output, and a logic high signal on output node 914 (e.g., in response to a command including a time period) may enable the second logic circuit.

Figure 10A:
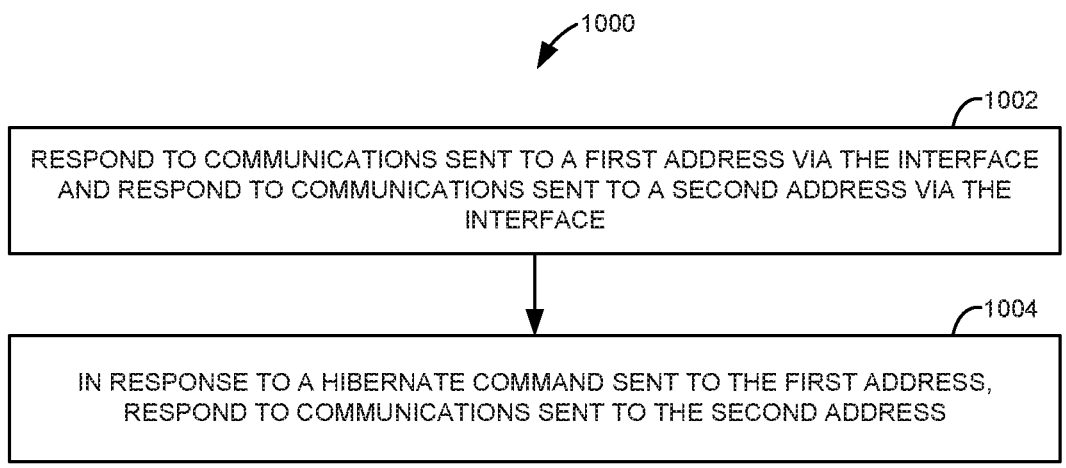
FIGS. 10A-10M are flow diagrams illustrating example methods that may be carried out by a logic circuitry package.

FIGS. 10A-10M are flow diagrams illustrating example methods 1000 that may be carried out by a logic circuitry package, such as logic circuitry package 400a-400d or 602, or by processing circuitry 424. As illustrated in FIG. 10A, at 1002 at least one logic circuit of the logic circuitry package may respond to communications sent to a first address via the interface and respond to communications sent to a second address via the interface. At 1004, the at least one logic circuit may in response to a hibernate command sent to the first address, respond to communications sent to the second address. In one example, the first address may be a first default address of the logic circuitry package and the second address may be a second default address and/or a reconfigured address of the logic circuitry package. The interface may include an I2C interface and the first address and the second address may be I2C compatible addresses.

Figure 10B:
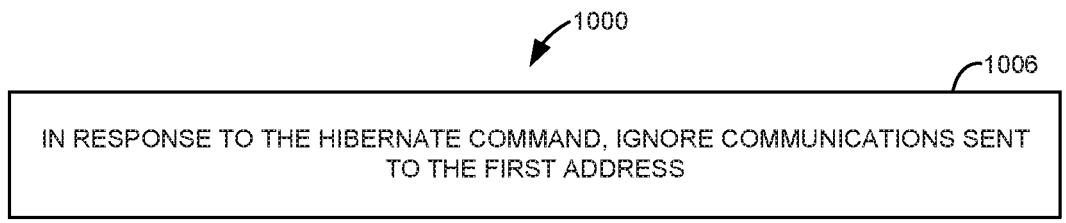

As illustrated in FIG. 10B, at 1006 the at least one logic circuit may further in response to the hibernate command, ignore communications sent to the first address.

Figure 10C:
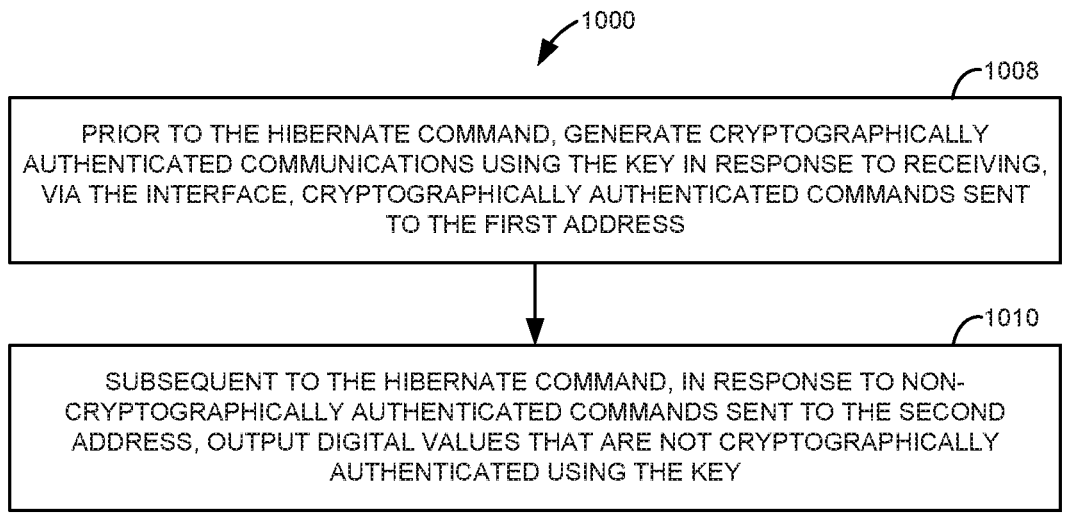

The logic circuitry package may include a memory (e.g., memory 800 of FIG. 8) storing a key (e.g., cryptographic key 804) to cryptographically authenticate communications. In this example, as illustrated in FIG. 10C, at 1008 the at least one logic circuit may further prior to the hibernate command, generate cryptographically authenticated communications using the key in response to receiving, via the interface, cryptographically authenticated commands sent to the first address. At 1010, the at least one logic circuit may subsequent to the hibernate command, in response to non-cryptographically authenticated commands sent to the second address, output digital values that are not cryptographically authenticated using the key.

Figure 10D:
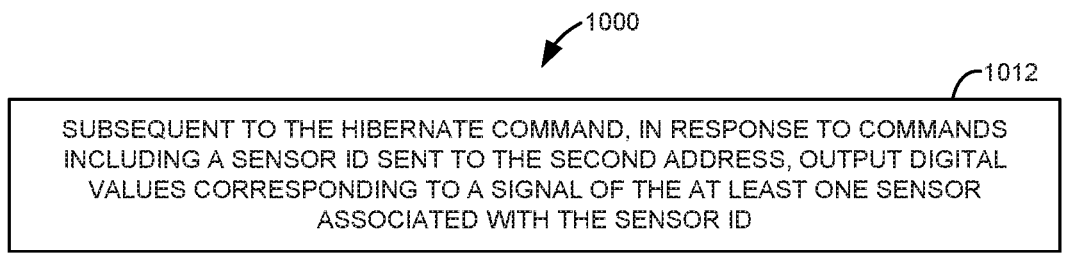
Figure 10E:
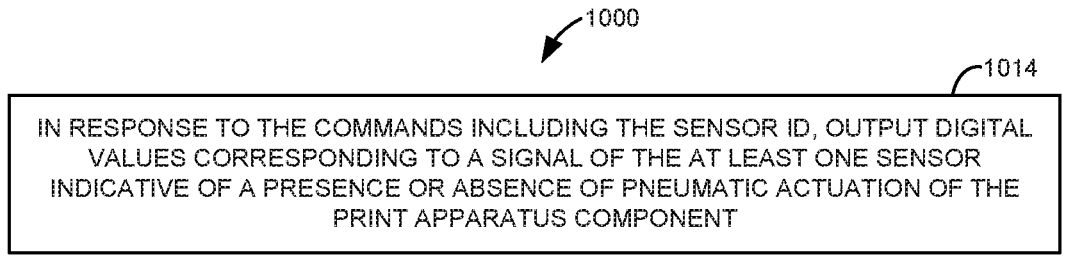

The logic circuitry package may include at least one sensor (e.g., 410 or 412 of FIG. 4B; 446, 450, 452, 454 of FIG. 4E; or 618 or 620 of FIG. 6). In this example, as illustrated in FIG. 10D, at 1012 the at least one logic circuit may further subsequent to the hibernate command, in response to commands including a sensor ID sent to the second address, output digital values corresponding to a signal of the at least one sensor associated with the sensor ID. The at least one sensor may include at least two sensors of different types. In this case, the at least one logic circuit may associate each of the at least two sensors with a different sensor ID and output digital values corresponding to a signal of the associated sensor. The at least one sensor may be configured to detect a pneumatic actuation of a print apparatus component. In this example, as illustrated in FIG. 10E, at 1014 the at least one logic circuit may further in response to the commands including the sensor ID, output digital values corresponding to a signal of the at least one sensor indicative of a presence or absence of pneumatic actuation of the print apparatus component. In one example, the sensor generates a different voltage based on the pneumatic actuation. In this case, the at least one logic circuit may output digital values based on the voltage.

In one example, the at least one logic circuit may subsequent to the hibernate command, in response to commands including a sensor ID sent to the second address, output a digital value corresponding to each sensor ID. In this case, different digital values may be generated for different sensor IDs and the digital values may correspond to a natural number of less than one byte. In another example, the at least one logic circuit may subsequent to a command including a sensor ID, in response to commands including a sensor sub-ID, output a digital value corresponding to each sensor sub-ID.

In one example, the logic circuitry package may include at least one sensor cell array with sensor cells of the same type. In this case, the at least one logic circuit may associate the sensor ID with the sensor type, associate each sensor sub-ID with a respective sensor cell to select the sensor cell, and output the digital values corresponding to a signal of the selected sensor cell.

In another example, the logic circuitry package may include at least one of a LUT, algorithm, and sensor. In this case, the at least one logic circuit may in response to commands including sensor IDs and/or sub-IDs, output digital values based on the at least one LUT, algorithm, and sensor.

Figure 10F:
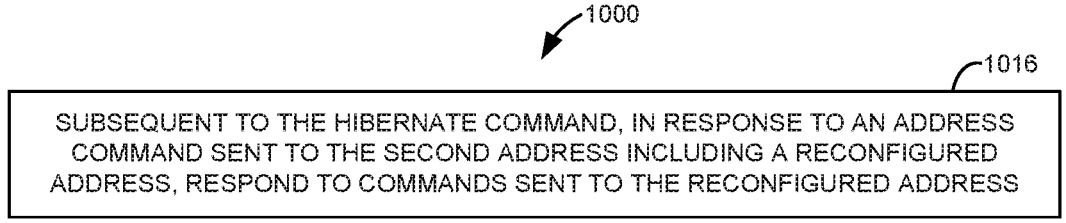

As illustrated in FIG. 10F, the at least one logic circuit may further subsequent to the hibernate command, in response to an address command sent to the second address including a reconfigured address, respond to commands sent to the reconfigured address.

Figure 10G:
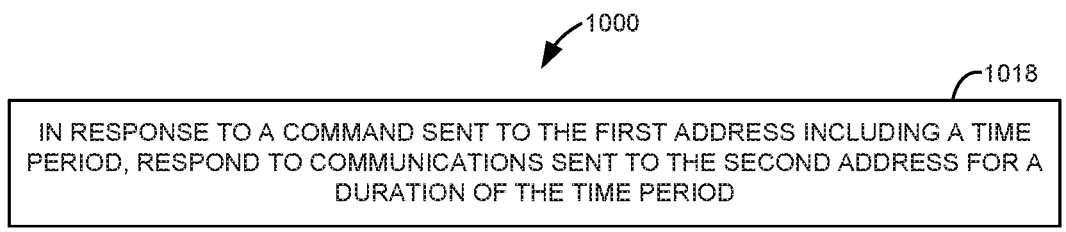
Figure 10H:
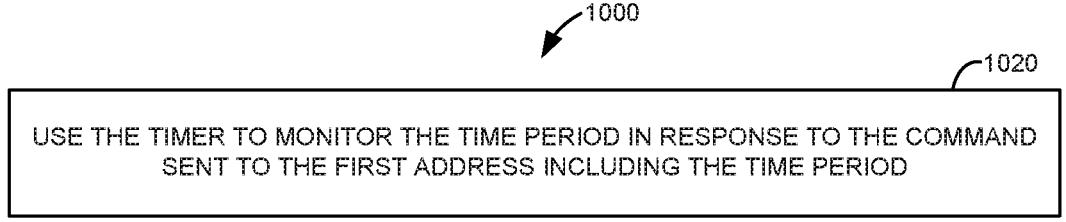

As illustrated in FIG. 10G, at 1018 the at least one logic circuit may further in response to a command sent to the first address including a time period, respond to communications sent to the second address for a duration of the time period. In one example, the at least one logic circuit may include a timer (e.g., 404a of FIG. 4B or 4D, 434 of FIG. 4E, or 610 of FIG. 6). In this example, as illustrated in FIG. 10H, at 1020 the at least one logic circuit may further use the timer to monitor the time period in response to the command sent to the first address including the time period.

Figure 10I:
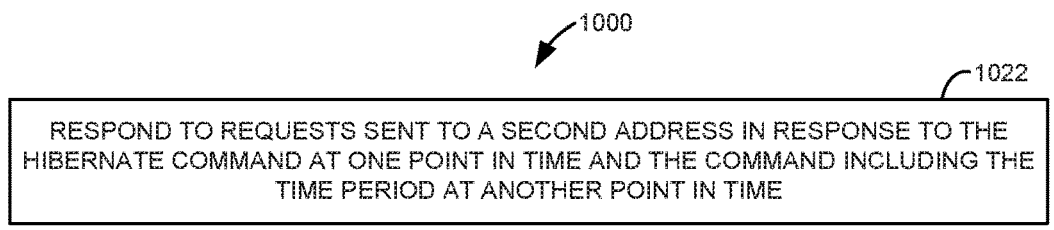
Figure 10J:
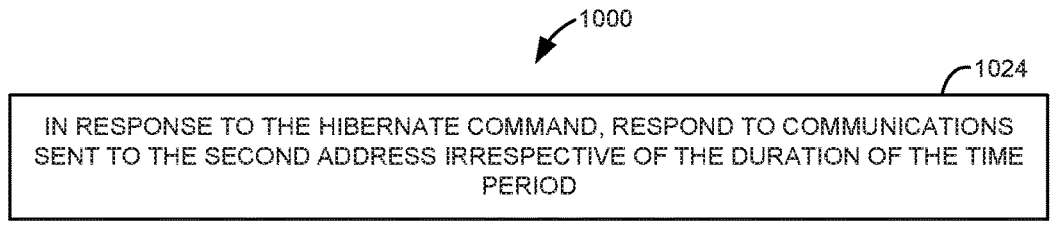

The logic circuitry package may include at least one sensor (e.g., 410 or 412 of FIG. 4B; 446, 450, 452, 454 of FIG. 4E; or 618 or 620 of FIG. 6) addressable via the hibernate command at one point in time and the command including the time period at another point in time. As illustrated in FIG. 10I, at 1022 the at least one logic circuit may further respond to requests sent to a second address in response to the hibernate command at one point in time and the command including the time period at another point in time. As illustrated in FIG. 10J, at 1024 the at least one logic circuit may further in response to the hibernate command, respond to communications sent to the second address irrespective of the duration of the time period.

Figure 10K:
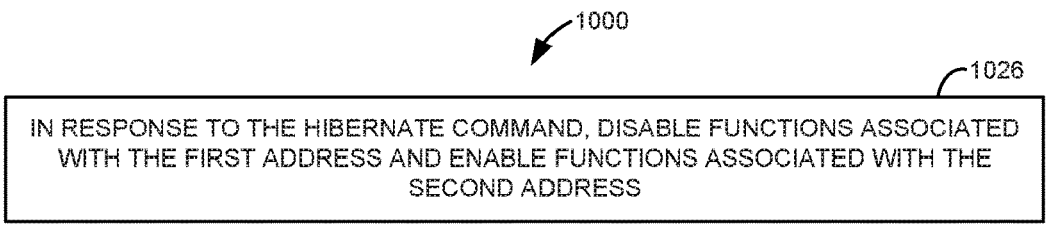

As illustrated in FIG. 10K, at 1026 the at least one logic circuit may further in response to the hibernate command, disable functions associated with the first address (e.g., memory and/or timer functions, such as 404a of FIG. 4B or 4D, 423a of FIG. 4C, 432 or 434 of FIG. 4E) and enable functions associated with the second address (e.g., memory, calibration, sensor, etc. functions as previously described with reference to FIGS. 4A-4E and 6). The logic circuit may switch to a lower power mode in response to the hibernate command. The functions associated with the first address may draw a current less than the functions associated with the second address. In one example, the functions associated with the first address may draw a current greater than 5 mA and the functions associated with the second address may draw a current greater than 0.3 mA.

Figure 10L:
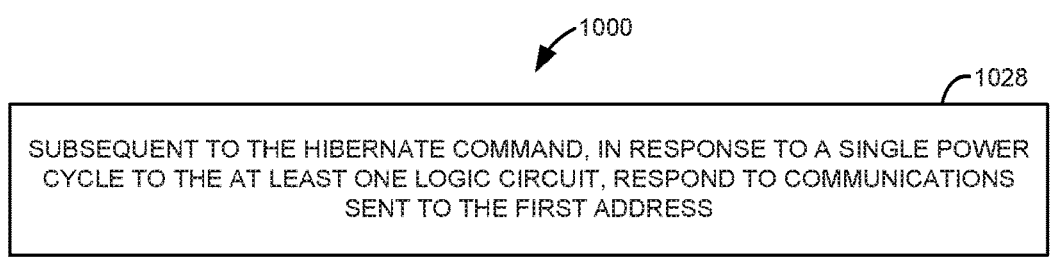
Figure 10M:
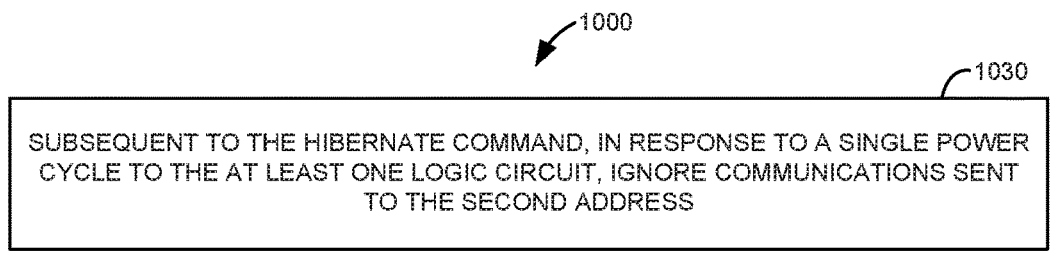

As illustrated in FIG. 10L, at 1028 the at least one logic circuit may further subsequent to the hibernate command, in response to a single power cycle to the at least one logic circuit, respond to communications sent to the first address. As illustrated in FIG. 10M, at 1030 the at least one logic circuit may further subsequent to the hibernate command, in response to a single power cycle to the at least one logic circuit, ignore communications sent to the second address.

Figure 11A:
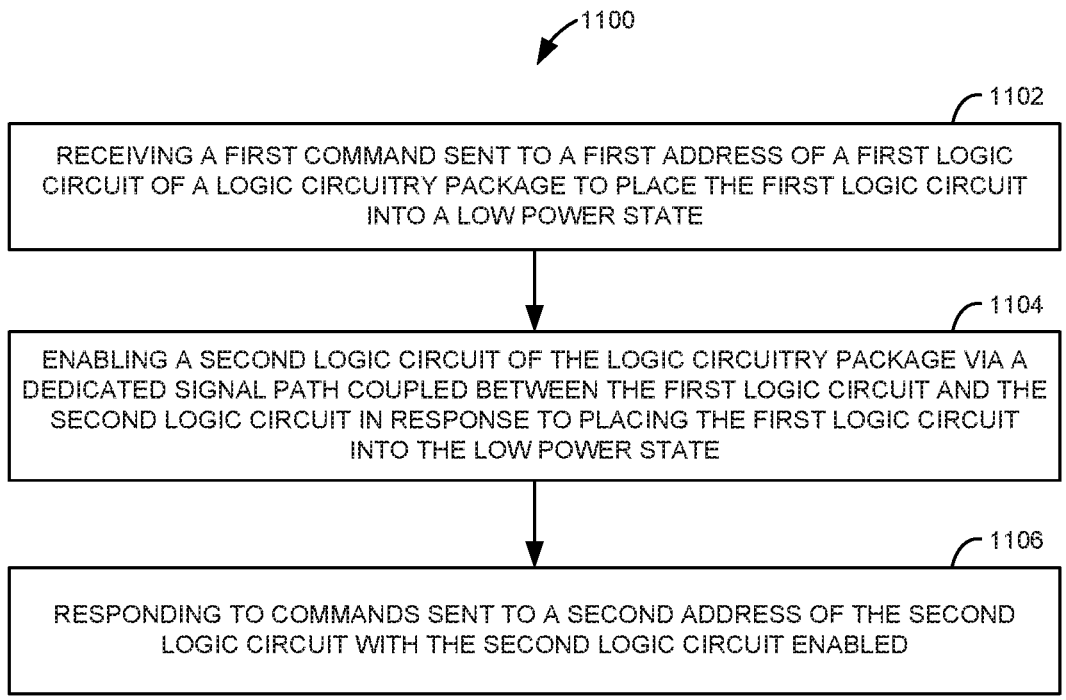
FIGS. 11A-11E are flow diagrams illustrating other example methods that may be carried out by a logic circuitry package.

FIGS. 11A-11E are flow diagrams illustrating other example methods 1100 that may be carried out by a logic circuitry package, such as logic circuitry package 400a-400d or 602, or by processing circuitry 424. As illustrated in FIG. 11A, at 1102 method 1100 may include receiving a first command sent to a first address of a first logic circuit (e.g., 402a-402e of FIGS. 4A-4E, respectively) of a logic circuitry package to place the first logic circuit into a low power state. At 1104, method 1100 may include enabling a second logic circuit (e.g., 406a of FIG. 4B, 406b of FIG. 4C, or 406c of FIG. 4E) of the logic circuitry package via a dedicated signal path (e.g., 408 of FIG. 4B or 422 of FIG. 4C) coupled between the first logic circuit and the second logic circuit in response to placing the first logic circuit into the low power state. At 1106, method 1100 may include responding to commands sent to a second address of the second logic circuit with the second logic circuit enabled.

Figure 11B:
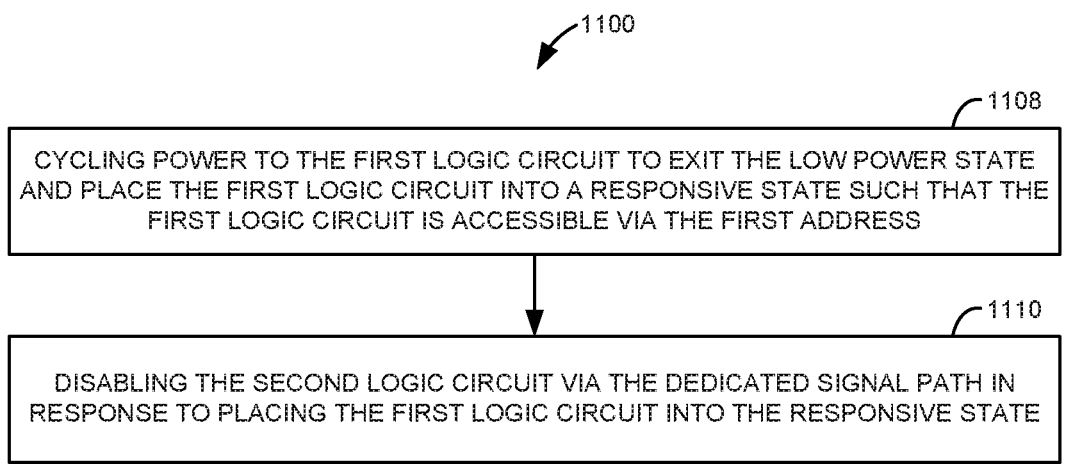

As illustrated in FIG. 11B, at 1108 method 1100 may further include cycling power to the first logic circuit to exit the low power state and place the first logic circuit into a responsive state such that the first logic circuit is accessible via the first address. At 1110, method 1100 may further include disabling the second logic circuit via the dedicated signal path in response to placing the first logic circuit into the responsive state.

Figure 11C:
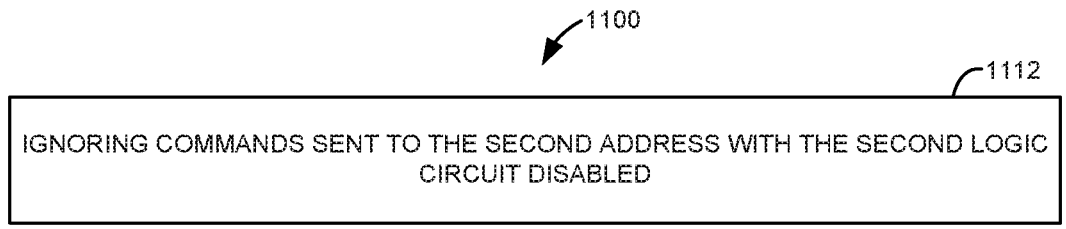
Figure 11D:
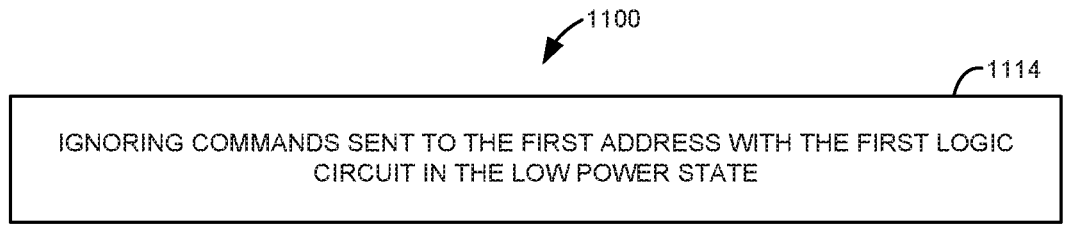
Figure 11E:
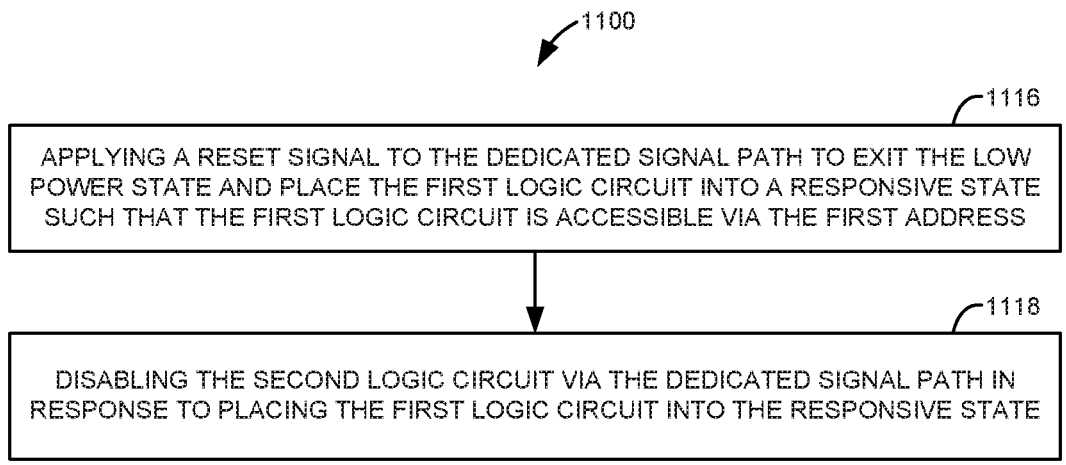

As illustrated in FIG. 11C, at 1112 method 1100 may further include ignoring commands sent to the second address with the second logic circuit disabled. As illustrated in FIG. 11D, at 1114 method 1100 may further include ignoring commands sent to the first address with the first logic circuit in the low power state. As illustrated in FIG. 11E, at 1116 method 1100 may further include applying a reset signal to the dedicated signal path to exit the low power state and place the first logic circuit into a responsive state such that the first logic circuit is accessible via the first address. At 1118, method 1100 may further include disabling the second logic circuit via the dedicated signal path in response to placing the first logic circuit into the responsive state.

Figure 12A:
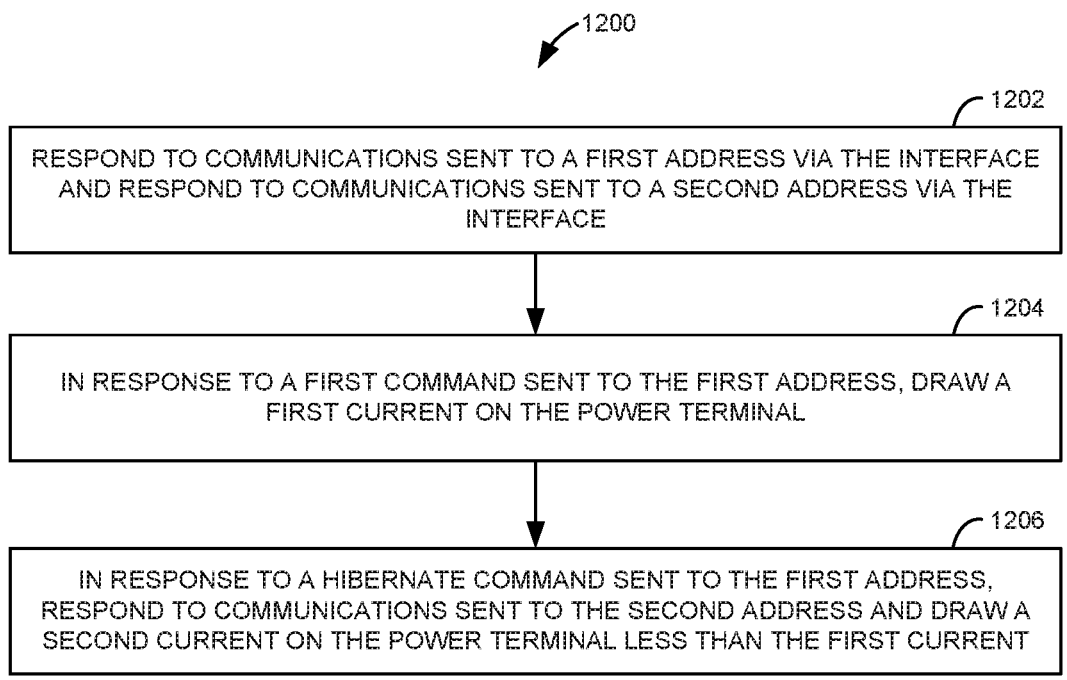
FIGS. 12A-12M are flow diagrams illustrating yet other example methods that may be carried out by a logic circuitry package.

FIGS. 12A-12M are flow diagrams illustrating yet other example methods 1200 that may be carried out by a logic circuitry package, such as logic circuitry package 400a-400d or 602, or by processing circuitry 424. In these examples, the logic circuitry package includes an interface including a power terminal (e.g., power/supply terminal 418a or ground terminal 418b of FIG. 4C). As illustrated in FIG. 12A, at 1202 at least one logic circuit of the logic circuitry package may respond to communications sent to a first address via the interface and respond to communications sent to a second address via the interface. At 1204, the at least one logic circuit may in response to a first command sent to the first address, draw a first current on the power terminal. At 1206, the at least one logic circuit may in response to a hibernate command sent to the first address, respond to communications sent to the second address and draw a second current on the power terminal less than the first current.

In one example, the first current may be greater than 3 mA and the second current may be less than 2 mA. In another example, the first current may be greater than 5 mA and the second current may be less than 0.5 mA. In yet another example, the first current may be greater than 8 mA and the second current may be less than 0.3 mA.

Figure 12B:
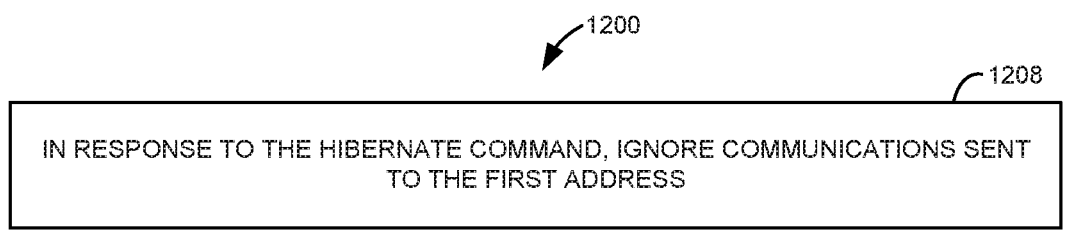

As illustrated in FIG. 12B, at 1208 the at least one logic circuit may further in response to the hibernate command, ignore communications sent to the first address.

Figure 12C:
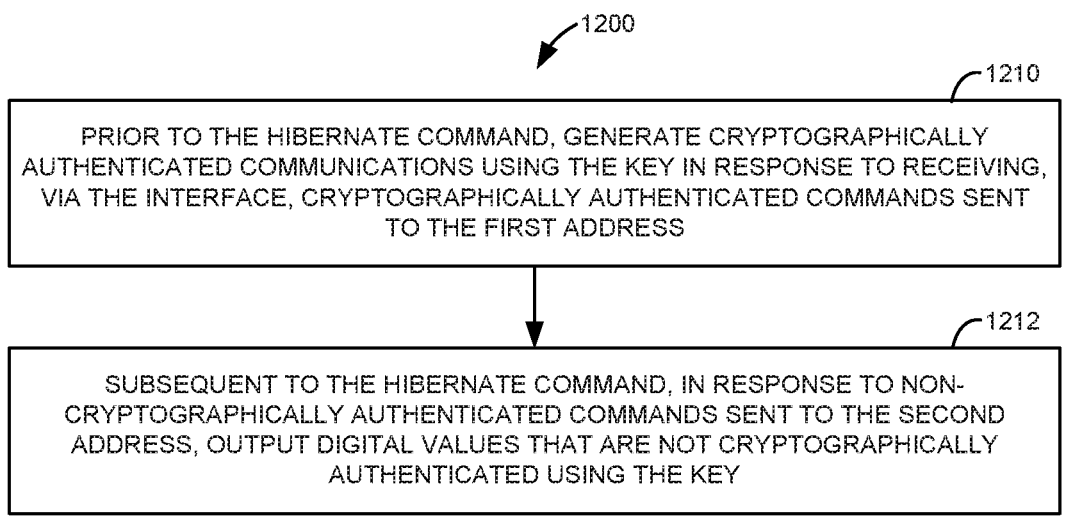

The logic circuitry package may include a memory (e.g., memory 800 of FIG. 8) storing a key (e.g., cryptographic key 804) to cryptographically authenticate communications. In this example, as illustrated in FIG. 12C, at 1210 the at least one logic circuit may prior to the hibernate command, generate cryptographically authenticated communications using the key in response to receiving, via the interface, cryptographically authenticated commands sent to the first address. At 1212, the at least one logic circuit may subsequent to the hibernate command, in response to non-cryptographically authenticated commands sent to the second address, output digital values that are not cryptographically authenticated using the key.

Figure 12D:
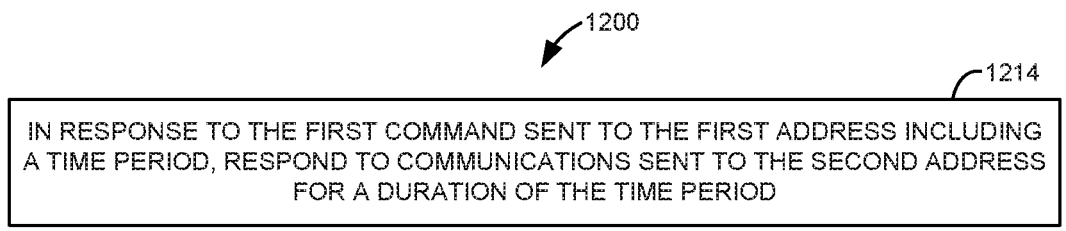
Figure 12E:
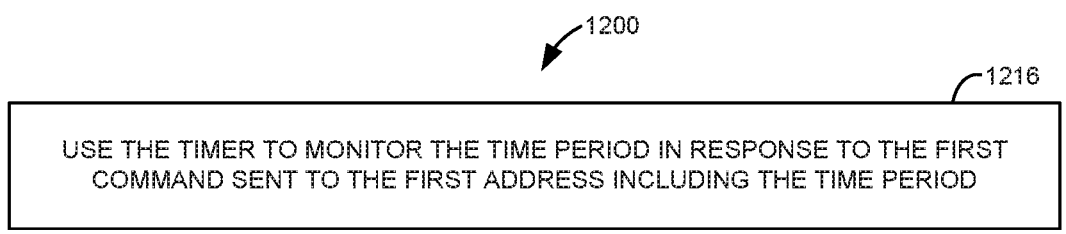
Figure 12F:
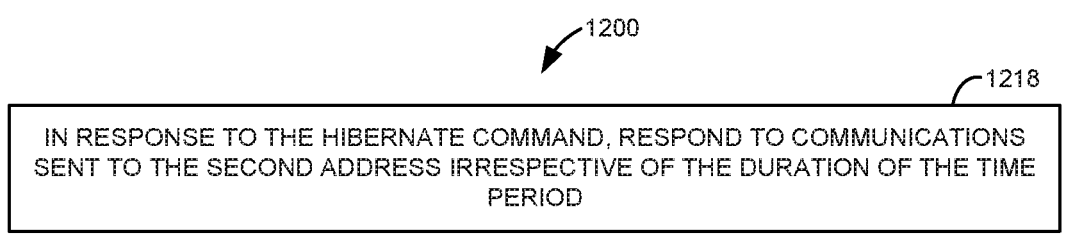

As illustrated in FIG. 12D, at 1214 the at least one logic circuit may further in response to the first command sent to the first address including a time period, respond to communications sent to the second address for a duration of the time period. In one example, the at least one logic circuit may include a timer (e.g., 404a of FIG. 4B or 4D, 434 of FIG. 4E, or 610 of FIG. 6). In this example, as illustrated in FIG. 12E, at 1216 the at least one logic circuit may further use the timer to monitor the time period in response to the first command sent to the first address including the time period. As illustrated in FIG. 12F, at 1218 the at least one logic circuit may further in response to the hibernate command, respond to communications sent to the second address irrespective of the duration of the time period.

Figure 12G:
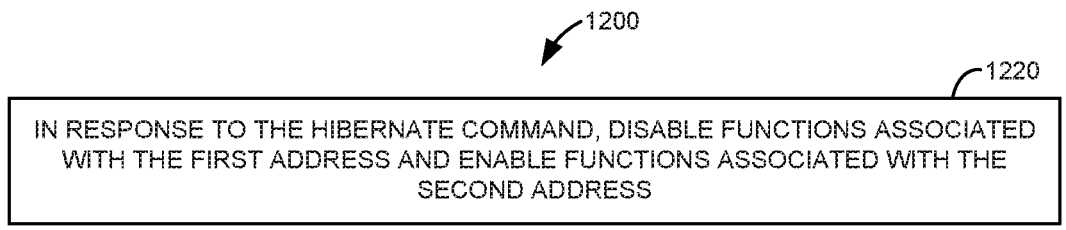

As illustrated in FIG. 12G, at 1220 the at least one logic circuit may further in response to the hibernate command, disable functions associated with the first address (e.g., memory and/or timer functions, such as 404a of FIG. 4B or 4D, 423a of FIG. 4C, 432 or 434 of FIG. 4E) and enable functions associated with the second address (e.g., memory, calibration, sensor, etc. functions as previously described with reference to FIGS. 4A-4E and 6).

Figure 12H:
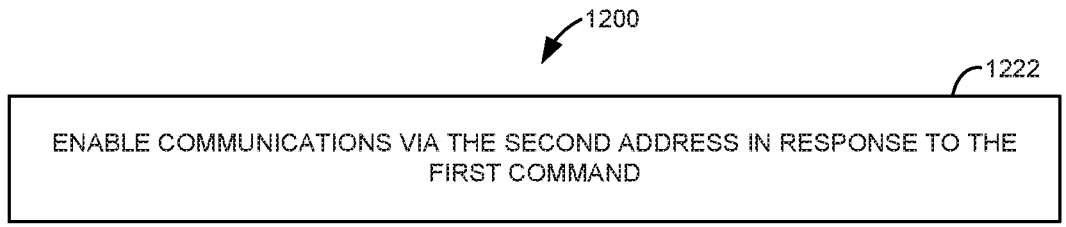
Figure 12I:
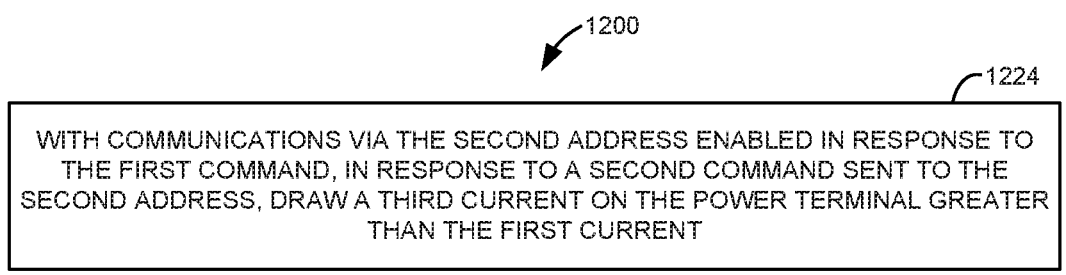
Figure 12J:
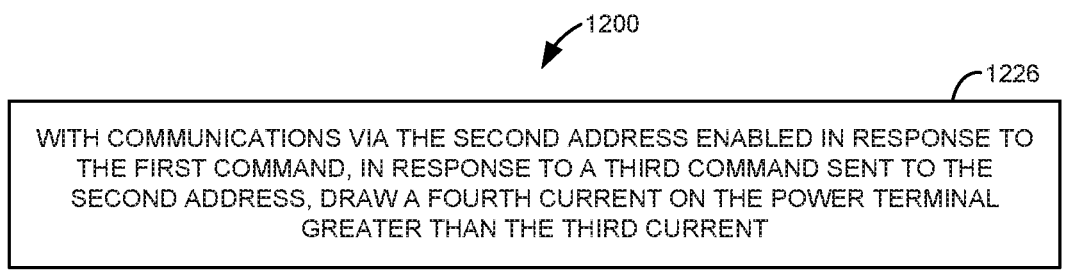

As illustrated in FIG. 12H, at 1222 the at least one logic circuit may further enable communications via the second address in response to the first command. As illustrated in FIG. 12I, at 1224 the at least one logic circuit may further with communications via the second address enabled in response to the first command, in response to a second command sent to the second address, draw a third current on the power terminal greater than the first current. In one example, the second command may enable an oscillator of the at least one logic circuit. As illustrated in FIG. 12J, at 1226 the at least one logic circuit may further with communications via the second address enabled in response to the first command, in response to a third command sent to the second address, draw a fourth current on the power terminal greater than the third current. In one example, the third command may enable an analog circuit of the at least one logic circuit.

Figure 12K:
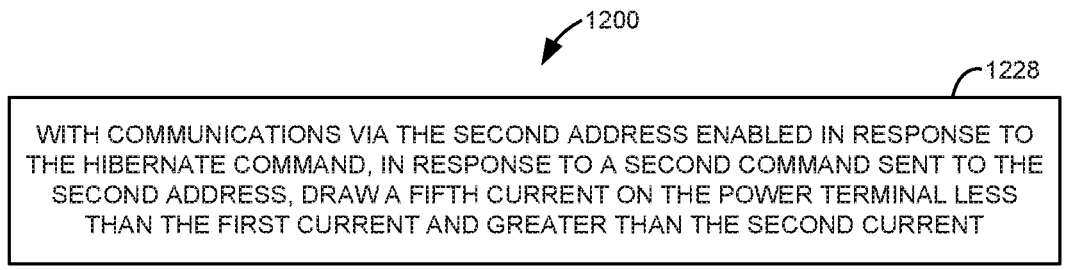
Figure 12L:
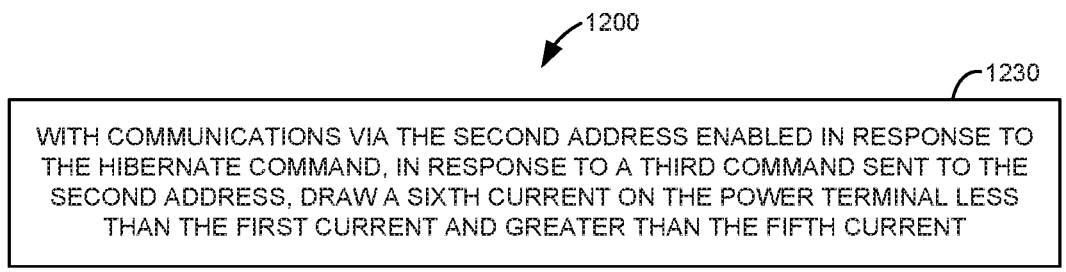

As illustrated in FIG. 12K, at 1228 the at least one logic circuit may further with communications via the second address enabled in response to the hibernate command, in response to a second command sent to the second address, draw a fifth current on the power terminal less than the first current and greater than the second current. In one example, the second command may enable an oscillator of the at least one logic circuit. As illustrated in FIG. 12L, at 1230 the at least one logic circuit may further with communications via the second address enabled in response to the hibernate command, in response to a third command sent to the second address, draw a sixth current on the power terminal less than the first current and greater than the fifth current. In one example, the third command may enable an analog circuit of the at least one logic circuit.

Figure 12M:
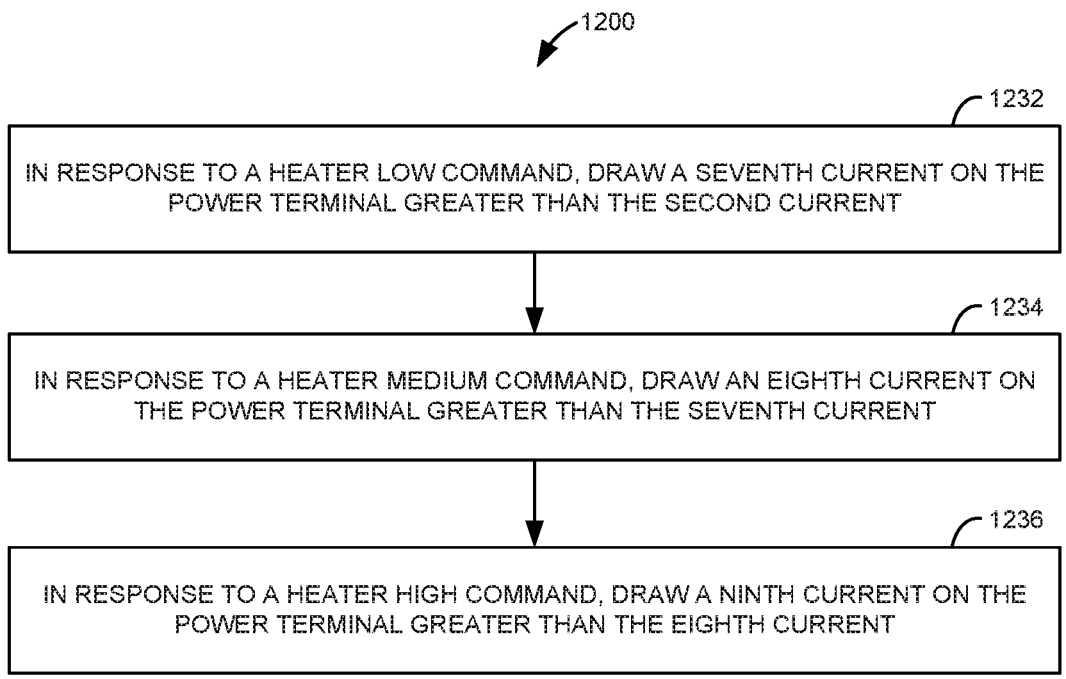

The at least one logic circuit may include at least one heater (e.g., 416 of FIG. 4B). In this case, as illustrated in FIG. 12M, at 1232 the at least one logic circuit may further in response to a heater low command, draw a seventh current on the power terminal greater than the second current. At 1234, the at least one logic circuit may in response to a heater medium command, draw an eighth current on the power terminal greater than the seventh current. At 1236, the at least one logic circuit may in response to a heater high command, draw a ninth current on the power terminal greater than the eighth current.

Expected values for the above described first through ninth currents of FIGS. 12A-12M may be stored in a memory, such as memory 800 as previously described and illustrated with reference to FIG. 8. The expected currents may be compared against corresponding measured currents to ensure the logic circuitry package is operating as expected (i.e., is not defective), to validate the logic circuitry package, or for other suitable purposes. In one example, a print apparatus may read the stored expected current values from the logic circuitry package, measure the currents during the various operating states of the logic circuitry package, and compare the expected currents to the measured currents.

Figure 13:
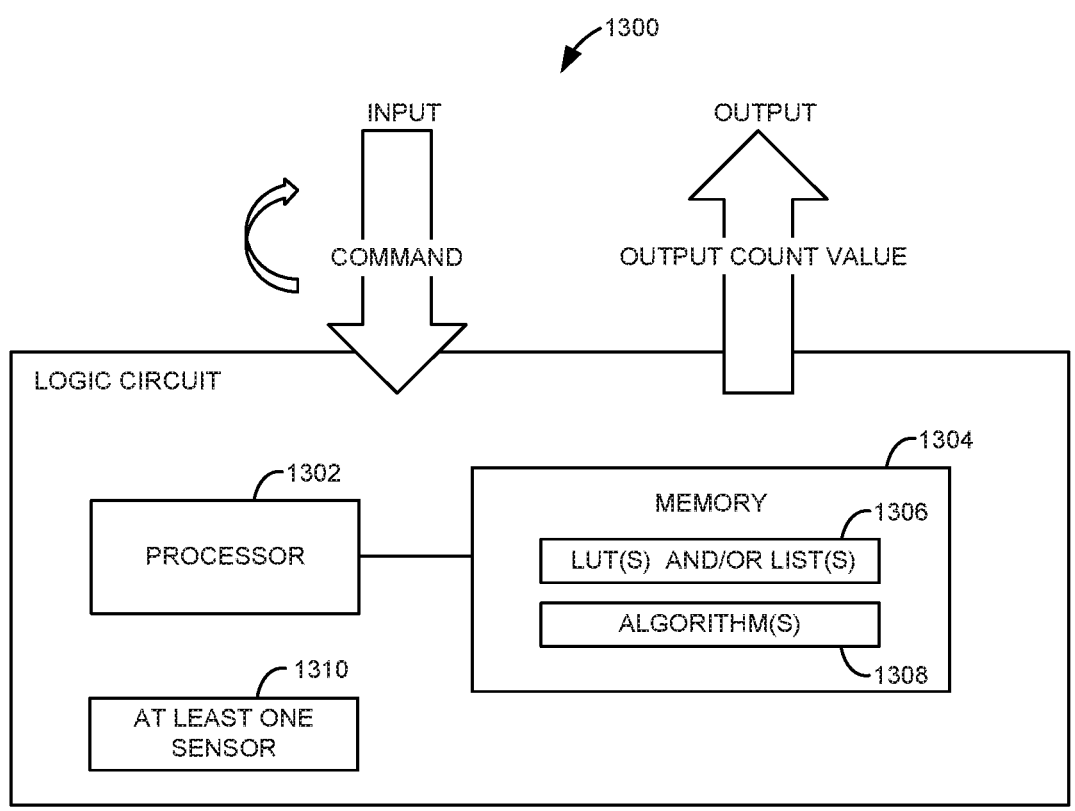
FIG. 13 illustrates another example of a logic circuitry package.

FIG. 13 illustrates another example of a logic circuitry package 1300. FIG. 13 illustrates how the logic circuitry package 1300 may generate a digital output (e.g., output count value) based on inputs including commands (e.g., requests including sensor IDs) sent digitally by the print apparatus. Logic circuitry package 1300 includes a logic circuit with a processor 1302 communicatively coupled to a memory 1304. Memory 1304 may store look up table(s) and/or list(s) 1306 and/or algorithm(s) 1308. Logic circuitry package 1300 may also include any of the features of logic circuitry packages 400a-400d or 602 or processing circuitry 424 as previously described.

For example, the logic circuitry package 1300 may include at least one sensor 1310, or multiple sensors of different types. In one example the logic circuitry package 1300 may not be provided with sensors. The logic circuit may be configured to consult a respective sensor 1310, in combination with the LUT(s) (look-up table)/list(s) 1306 and/or algorithm(s) 1308, based on the commands, to generate the digital output. In this disclosure, any list or table that is used to associate sensor IDs and sensor sub-IDs with output values may be defined as a LUT. The at least one sensor 1310 may include a sensor to detect a pneumatic event such as a prime pressure; an ink level within a print material reservoir of a replaceable print component; a sensor to detect an approximate temperature; and/or other sensors. The logic circuitry package 1300 may include a plurality of sensors of different types, for example, at least two sensors of different types, wherein the logic circuit may be configured to select and consult one of the sensors based on the sensor ID, and output a digital value based on a signal of the selected sensor. In another example, the logic circuit may be configured to select and consult a respective LUT listing or algorithm based on the received sensor ID to generate the digital value, for example, without using a sensor signal.

As already explained above, received parameters may include calibration parameters, address parameters and sensor (sub) ID parameters. Different sets of all the parameters are related to the different output count values as already explained above, whereby the output count value associated with the parameters is one that is accepted by the print apparatus logic circuit. The output count values may be generated using the LUT(s) and or list(s) 1306 and/or algorithm(s) 1308 whereby the parameters may be used as input. In addition, a signal of at least one sensor 1310 may be consulted as input for the LUT. In this case, the output count values may be digitally generated, rather than obtained from analog sensor measurements. For example, logic circuitry package 1300 may implement method 1000 of FIGS. 10A-10M, method 1100 of FIGS. 11A-11E, and/or method 1200 of FIGS. 12A-12M without converting any actual sensor measurements. In another example, analog sensor measurements may be used to thereafter digitally generate the output count value, not necessarily directly converted, but rather, using a LUT, list or algorithm, whereby the sensor signal is used to choose a portion or function of the LUT, list or algorithm. The example logic circuitry package 1300 may be used as an alternative to the complex thin film sensor arrays addressed elsewhere in this disclosure. The example logic circuitry package 1300 may be configured to generate outputs that are validated by the same print apparatus logic circuit designed to be compatible with the complex sensor array packages. The alternative package 1300 may be cheaper or simpler to manufacture, or simply be used as an alternative to the earlier mentioned packages, for example to facilitate printing and validation by the print apparatus. The alternative package may be more robust, because fully or partially digitally generated/emulated signals may be more reliable than output that needs to rely on analog sensor signals that can be relatively difficult to control.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400*a*-400*d*, 602, 1300 described herein may have any feature of any other logic circuitry packages 400*a*-400*d*, 602, 1300 described herein or of the processing circuitry 424. Any logic circuitry packages 400*a*-400*d*, 602, 1300 or the processing circuitry 424 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a replaceable print apparatus component, the logic circuitry package comprising:
   an interface including a power terminal; and
   at least one logic circuit configured to:
      respond to communications sent to a first address via the interface and respond to communications sent to a second address via the interface;
      in response to a first command sent to the first address, draw a first current on the power terminal; and
      in response to a hibernate command sent to the first address, respond to communications sent to the second address and draw a second current on the power terminal less than the first current.

2. The logic circuitry package of claim 1, wherein the at least one logic circuit is configured to:
   in response to the hibernate command, ignore communications sent to the first address, further comprising:
   a memory storing a key to cryptographically authenticate communications,
   wherein the at least one logic circuit is configured to:
      prior to the hibernate command, generate cryptographically authenticated communications using the key in response to receiving, via the interface, cryptographically authenticated commands sent to the first address, and
      subsequent to the hibernate command, in response to non-cryptographically authenticated commands sent to the second address, output digital values that are not cryptographically authenticated using the key.

3. The logic circuitry package of claim 1, wherein the at least one logic circuit is configured to:
   in response to the first command sent to the first address including a time period, respond to communications sent to the second address for a duration of the time period, wherein the at least one logic circuit includes a timer, and
   wherein the at least one logic circuit is configured to:
      use the timer to monitor the time period in response to the first command sent to the first address including the time period.

4. The logic circuitry package of claim 3, wherein the at least one logic circuit is configured to:
   in response to the hibernate command, respond to communications sent to the second address irrespective of the duration of the time period.

5. The logic circuitry package of claim 1, wherein the at least one logic circuit is configured to:
   in response to the hibernate command, disable functions associated with the first address and enable functions associated with the second address.

6. The logic circuitry package of claim 1, wherein the at least one logic circuit comprises:
   a first logic circuit configured to respond to communications sent to the first address; and
   a second logic circuit configured to respond to communications sent to the second address,
   wherein the first logic circuit is disabled and the second logic circuit is enabled in response to the hibernate command.

7. The logic circuitry package of claim 1, wherein the at least one logic circuit comprises a memory storing digital values corresponding to the first current and the second current, wherein the memory stores digitally signed data comprising the digital values corresponding to the first current and the second current.

8. The logic circuitry package of claim 1, wherein the at least one logic circuit is configured to enable communications via the second address in response to the first command, wherein the at least one logic circuit is configured to:
   with communications via the second address enabled in response to the first command, in response to a second command sent to the second address, draw a third current on the power terminal greater than the first current.

9. The logic circuitry package of claim 8, wherein the at least one logic circuit is configured to:
with communications via the second address enabled in response to the first command, in response to a third command sent to the second address, draw a fourth current on the power terminal greater than the third current wherein the at least one logic circuit comprises a memory storing digital values corresponding to the third current and the fourth current.

10. The logic circuitry package of claim 9, wherein the memory stores digitally signed data comprising the digital values corresponding to the third current and the fourth current.

11. The logic circuitry package of claim 9, wherein the at least one logic circuit further comprises:
an oscillator; and
an analog circuit,
wherein the second command enables the oscillator and the third command enables the analog circuit.

12. The logic circuitry package of claim 1, wherein the at least one logic circuit is configured to:
with communications via the second address enabled in response to the hibernate command, in response to a second command sent to the second address, draw a fifth current on the power terminal less than the first current and greater than the second current.

13. The logic circuitry package of claim 12, wherein the at least one logic circuit is configured to:
with communications via the second address enabled in response to the hibernate command, in response to a third command sent to the second address, draw a sixth current on the power terminal less than the first current and greater than the fifth current.

14. The logic circuitry package of claim 13, wherein the at least one logic circuit comprises a memory storing digital values corresponding to the fifth current and the sixth current.

15. The logic circuitry package of claim 14, wherein the memory stores digitally signed data comprising the digital values corresponding to the fifth current and the sixth current.

16. The logic circuitry package of claim 13, wherein the at least one logic circuit further comprises:
an oscillator; and
an analog circuit,
wherein the second command enables the oscillator and the third command enables the analog circuit.

17. The logic circuitry package of claim 1, wherein the at least one logic circuit comprises at least one heater, and
wherein, with communications via the second address enabled, the at least one logic circuit is configured to:
in response to a heater low command, draw a seventh current on the power terminal greater than the second current;
in response to a heater medium command, draw an eighth current on the power terminal greater than the seventh current; and
in response to a heater high command, draw a ninth current on the power terminal greater than the eighth current.

18. The logic circuitry package of claim 17, wherein the at least one logic circuit comprises a memory storing digital values corresponding to the seventh current, the eighth current, and the ninth current.

19. The logic circuitry package of claim 18, wherein the memory stores digitally signed data comprising the digital values corresponding to the seventh current, the eighth current, and the ninth current.

20. The logic circuitry package of claim 1, wherein the at least one logic circuit is configured to draw a standby current on the power terminal less than the first current and greater than the second current after power-up but prior to any commands being sent to the logic circuitry package.

* * * * *